United States Patent
Shih et al.

(10) Patent No.: US 11,849,499 B2
(45) Date of Patent: Dec. 19, 2023

(54) METHOD AND APPARATUS FOR ACQUIRING SYSTEM INFORMATION

(71) Applicant: FG Innovation Company Limited, Tuen Mun (HK)

(72) Inventors: Mei-Ju Shih, Taipei (TW); Hung-Chen Chen, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/868,003

(22) Filed: Jul. 19, 2022

(65) Prior Publication Data
US 2022/0353944 A1    Nov. 3, 2022

Related U.S. Application Data

(63) Continuation of application No. 17/036,697, filed on Sep. 29, 2020, now Pat. No. 11,438,957.
(60) Provisional application No. 62/909,953, filed on Oct. 3, 2019.

(51) Int. Cl.
| | |
|---|---|
| *H04W 76/27* | (2018.01) |
| *H04W 72/21* | (2023.01) |
| *H04W 72/231* | (2023.01) |
| *H04W 72/20* | (2023.01) |

(52) U.S. Cl.
CPC .......... *H04W 76/27* (2018.02); *H04W 72/20* (2023.01); *H04W 72/21* (2023.01); *H04W 72/231* (2023.01)

(58) Field of Classification Search
CPC ...... H04L 5/001; H04L 5/0053; H04W 48/14; H04W 72/20; H04W 72/21; H04W 72/23; H04W 72/231; H04W 76/10; H04W 76/27
See application file for complete search history.

(56) References Cited

U.S. PATENT DOCUMENTS 11,109,212 B2 *   8/2021  Agiwal ................... H04W 4/90

FOREIGN PATENT DOCUMENTS

WO      WO-2021029288 A1 *    2/2021

* cited by examiner

*Primary Examiner* — Thomas R Cairns
(74) *Attorney, Agent, or Firm* — ScienBiziP, P.C.

(57) ABSTRACT

A method for acquiring system information (SI) performed by a user equipment (UE) is provided. The method includes performing a first set of operations after determining that the UE is in a radio resource control (RRC)_CONNECTED state with an active bandwidth part (BWP) not configured with a common search space (CSS) with a field searchSpaceOtherSystemInformation; and performing a second set of operations after determining that the UE is in the RRC_CONNECTED state with the active BWP configured with the CSS with the field searchSpaceOtherSystemInformation. The first set of operations includes: transmitting a first RRC message to request a required system information block (SIB) and starting a timer; and receiving, from the cell, an RRCReconfiguration message including the required SIB. The second set of operations includes: transmitting the first RRC message to request the required SIB and starting the timer; and monitoring the CSS to acquire the required SIB.

20 Claims, 4 Drawing Sheets

100

110

METHOD AND APPARATUS FOR ACQUIRING SYSTEM INFORMATION

CROSS-REFERENCE TO RELATED APPLICATION(S)

The present disclosure is a continuation application of U.S. patent application Ser. No. 17/036,697, filed on Sep. 29, 2020, which claims the benefit of and priority to U.S. Provisional Patent Application Ser. No. 62/909,953, filed on Oct. 3, 2019. The contents of all above-named applications are hereby fully incorporated herein by reference for all purposes.

FIELD

The present disclosure is related to wireless communication and, more specifically, to a method for acquiring system information (SI) in cellular wireless communication networks.

BACKGROUND

Various efforts have been made to improve different aspects of wireless communication for cellular wireless communication systems, such as fifth generation (5G) New Radio (NR), by improving data rate, latency, reliability, and mobility.

The 5GNR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is related to a method for acquiring SI in a cellular wireless communication network.

In a first aspect of the present disclosure, a method for acquiring SI performed by a user equipment (UE) is provided. The method includes: performing a first set of operations after determining that the UE is in a Radio Resource Control (RRC)_CONNECTED state with an active bandwidth part (BWP) not configured with a common search space (CSS) with a field searchSpaceOtherSystemInformation; and performing a second set of operations after determining that the UE is in the RRC_CONNECTED state with the active BWP configured with the CSS with the field searchSpaceOtherSystemInformation. The first set of operations includes: transmitting, to a cell, a first RRC message to request a required system information block (SIB) and starting a timer, after determining that (i) the required SIB is provided by the cell, (ii) the UE is allowed to request a SIB on-demand, and (iii) the timer is not running; and receiving, from the cell, an RRCReconfiguration message including the required SIB. The second set of operations includes: transmitting, to the cell, the first RRC message to request the required SIB and starting the timer, after determining that (i) the required SIB is provided by the cell, (ii) the required SIB is not being broadcast in the cell, (iii) the UE is allowed to request a SIB on-demand, and (iv) the timer is not running; and monitoring the CSS to acquire the required SIB.

In an implementation of the first aspect, the method further comprises receiving, from the cell, a system information block type 1 (SIB1), wherein the SIB1 indicates whether the required SIB is provided by the cell.

In an implementation of the first aspect, the SIB1 further indicates whether the required SIB is being broadcast in the cell.

In an implementation of the first aspect, the first set of operations further comprises monitoring a configured UE-specific search space in the active BWP for the reception of the RRCReconfiguration message after transmitting the first RRC message.

In an implementation of the first aspect, monitoring the CSS comprises monitoring the CSS for a downlink control information (DCI) format with cyclic redundancy check (CRC) scrambled by a system information radio network temporary identifier (SI-RNTI) to derive a resource for reception of the required SIB after transmitting the first RRC message.

In an implementation of the first aspect, the second set of operations further comprises stopping monitoring the CSS during an SI time window after acquiring the required SIB.

In an implementation of the first aspect, the method further comprises receiving a second RRC message including an indicator that indicates whether the UE is allowed to request a SIB on-demand.

In an implementation of the first aspect, the method further comprises stopping the timer after receiving the required SIB; and receiving a second RRC message that indicates an initial value of the timer before transmitting the first RRC message, wherein the UE is not allowed to transmit the first RRC message to request another SIB when the timer is running.

In an implementation of the first aspect, the first RRC message indicates at least one of a list of requested SIBs with ENUMERATED format or a list of requested positioning SIBs (posSIBs) with ENUMERATED format.

In an implementation of the first aspect, the method further comprises sending, by a radio link control (RLC) acknowledged mode (AM) entity of the UE, an RLC AM protocol data unit (PDU) that includes the first RRC message to a medium access control (MAC) entity of the UE in an uplink dedicated control channel (UL-DCCH) over signaling radio bearer 1 (SRB1).

In a second aspect of the present disclosure, a UE is provided. The UE includes one or more processors and at least one memory coupled to at least one of the one or more processors. The at least one memory stores a computer-executable program that, when executed by the at least one of the one or more processors, causes the UE to perform a first set of operations after determining that the UE is in an RRC_CONNECTED state with an active BWP not configured with a CSS with a field searchSpaceOtherSystemInformation, and perform a second set of operations after determining that the UE is in the RRC_CONNECTED state with the active BWP configured with the CSS with the field searchSpaceOtherSystemInformation. The first set of operations comprises transmitting, to a cell, a first RRC message to request a required SIB and starting a timer, after determining that (i) the required SIB is provided by the cell, (ii) the UE is allowed to request a SIB on-demand, and (iii) the timer is not running; and receiving, from the cell, an RRCReconfiguration message including the required SIB. The second set of operations comprises transmitting, to the cell, the first RRC message to request the required SIB and starting the timer, after determining that (i) the required SIB is provided by the cell, (ii) the required SIB is not being broadcast in the cell, (iii) the UE is allowed to request a SIB on-demand, and (iv) the timer is not running; and monitoring the CSS to acquire the required SIB.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1A:
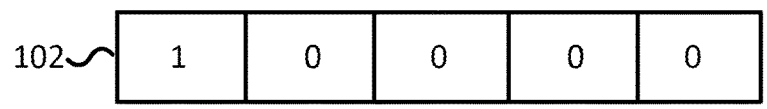
FIG. 1A is a diagram illustrating an example RRC message for on-demand SI request according to an example implementation of the present disclosure.
Figure 1A:
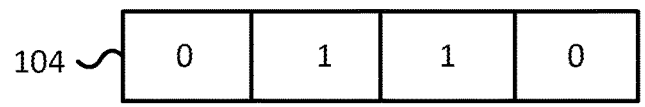

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. A and/or B and/or C may represent that at least one of A, B, or C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processors (DSPs). Although some of the disclosed implementations are oriented to software installed and executing on computer hardware, alternative implementations implemented as firmware, or as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more B Ss.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may be operable to provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR supports flexible configurations for accommodating various next-generation (e.g., 5G) communication requirements, such as eMBB, mMTC, and URLLC, while fulfilling high reliability, high data rate, and low latency requirements. The Orthogonal Frequency-Division Multiplexing (OFDM) technology in the 3$^{rd}$ Generation Partnership Project (3 GPP) may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Multiple Public Land Mobile Networks (PLMNs) (or Non-Public Networks (NPNs)) may operate on the unlicensed spectrum. Multiple PLMNs/NPNs may share the same unlicensed carrier. The PLMNs may be public or private. Public PLMNs may be (but not limited to) the operators or virtual operators, which provide radio services to the public subscribers. Public PLMNs may own the licensed spectrum and support the RAT on the licensed spectrum as well. Private PLMNs may be (but are not limited to) the micro-operators, factories, or enterprises, which provide radio services to their private users (e.g., employees or machines). In some implementations, public PLMNs may support more deployment scenarios (e.g., carrier aggregation between licensed band NR (as a PCell) and NR-U (as an SCell), dual connectivity between licensed band LTE (as a PCell) and NR-U (as a PSCell), stand-alone NR-U, an NR cell with DL in the unlicensed band and UL in the licensed band, and dual connectivity between licensed band NR (as a PCell) and NR-U (as a PSCell)). In some implementations, private PLMNs may mainly support (but are not limited to) the stand-alone unlicensed RAT (e.g., stand-alone NR-U). The NPN may be a Standalone NPN (SNPN), a Public Network Integrated-NPN (PNI-NPN) or be implemented by a PLMN with a private slice. An SNPN may be operated by an NPN operator and may not rely on network functions provided by a PLMN. A PNI-NPN may be deployed with the support of a PLMN. The NPN may be deployed on the licensed band or unlicensed band. The NPN may support different deployment scenarios (e.g., carrier aggregation between licensed band NR (as a PCell) and NR-U (as an SCell), dual connectivity between licensed band LTE (as a PCell) and NR-U (as a PSCell), stand-alone NR-U, an NR cell with DL in an unlicensed band and UL in a licensed band, and dual connectivity between licensed band NR (as a PCell) and NR-U (as a PSCell)).

On-demand SI request and reception can increase resource efficiency and energy efficiency in the next-generation cellular network. In NR Rel-15, on-demand SI request and reception procedure is mainly used for an RRC_IDLE/RRC_INACTIVE UE. The RRC_IDLE/RRC_INACTIVE UE may perform an SI request procedure via a Random Access (RA) procedure. For example, in a Msg1-based approach, the RRC_IDLE/RRC_INACTIVE UE may send RACH preambles indicating the required SI. For example, in a Msg3-based approach, the RRC_IDLE/RRC_INACTIVE UE may send an RRC System Information Request message to a camped cell for the required SI. However, an on-demand SI request and reception procedure for an RRC_CONNECTED UE is not yet defined.

System Information Blocks (SIBs) other than System Information Block Type 1 (SIB1) may be carried in SystemInformation (SI) messages, which are transmitted on the Downlink-Shared Channel (DL-SCH). Only SIBs having the same periodicity can be mapped to the same SI message. Each SI message is transmitted within periodically occurring time windows (referred to as SI-windows with the same length for all SI messages). Each SI message is associated with an SI-window. The SI-windows of different SI messages do not overlap. That is, within one SI-window, only the corresponding SI message is transmitted. An SI message may be transmitted multiple times within the SI-window.

Any SIB except SIB1 may be configured as cell-specific or area-specific, using an indication in SIB1. A cell-specific SIB is applicable only within a cell that provides the SIB while an area-specific SIB is applicable within an area referred to as SI area, which may include one or more cells and may be identified by systemInformationAreaID.

For a UE in an RRC_CONNECTED state (also referred to as an RRC_CONNECTED UE), the network may provide system information via dedicated signaling using an RRCReconfiguration message. In one implementation, the network may provide the system information via dedicated signaling if the UE has an active BWP with no common search space (CSS) configured to monitor system information or paging. In one implementation, the RRCReconfiguration message may include SIB1, SIB6, SIB7, and SIB8. SIB6 may include an Earthquake and Tsunami Warning System (ETWS) primary notification. SIB7 may include an ETWS secondary notification. SIB8 may include a Commercial Mobile Alert Service (CMAS) notification.

UEs in the RRC_CONNECTED state may monitor for an SI change indication in any paging occasion at least once per modification period if the UE is provided with CSS on the active BWP to monitor paging.

ETWS or CMAS capable UEs in the RRC_CONNECTED state may monitor for an indication about Public Warning System (PWS) notification in any paging occasion at least once every defaultPagingCycle if the UE is provided with a CSS on the active BWP to monitor paging.

If the UE is in the RRC_CONNECTED state with an active BWP configured with a CSS, which may be configured by a searchSpaceSIB1 Information Element (IE) and a pagingSearchSpace IE, and the UE has received an indication about a change of system information, the UE will acquire the SIB1.

On-demand SI request and reception for an RRC_CONNECTED UE may be relevant to several features (e.g., V2X, positioning, Industrial Internet-of-Things (IIoT)). A procedure for on-demand SI request and reception for the RRC_CONNECTED UE is provided in this disclosure. An SI request message and a feedback message are introduced for the on-demand SI request and reception procedure, mainly targeting the RRC_CONNECTED UE, but not limited thereto. The on-demand SI may be used to realize V2X (either upon Uu interface or PC5 interface), positioning, and IIoT features, but not limited thereto. The proposed on-demand SI request and reception procedure may also be applied when an SI update is required.

In one implementation, an on-demand SI request and reception procedure for an RRC_CONNECTED UE may not utilize the RA procedure. If the UE is configured with CSS to receive the system information on the active (DL) BWP, the UE may check whether the required SI is broadcast by reading SIB1. The SIB1 (e.g., an IE in the SIB1) may indicate whether a SIB is broadcast (or is being broadcast) in the cell that broadcasts the SIB1. The phrases "a SIB (or an SI message) is broadcast in the cell" and "a SIB (or an SI message) is being broadcast in the cell" may be used interchangeably in the present disclosure. In one implementation, if the SIB1 indicates that a SIB (or an SI message) is broadcast in the cell, the UE may expect to receive the SIB (or the SI message) one or more times within a specific period from the cell. The specific period may take place after (or before) the UE receives the SIB1. The specific period may end after the UE receives the SIB1 and the corresponding SIB (or SI message). If the required SI is broadcast by the network, the UE may not transmit an RRC message for on-demand SI request (e.g., RRC System Information Request message) to the network. In one implementation, the UE may determine (or check) whether it is configured with CSS to receive the system information on the active (DL) BWP first, and then the UE may further check whether the required SI is broadcast by reading SIB1. In another implementation, the UE may check whether the required SI is broadcast by reading SIB1 first, and then the UE may further determine (or check) whether it is configured with CSS to receive the system information on the active (DL) BWP. It is possible that the UE may simultaneously check whether the required SI is broadcast by reading SIB1 and determine (or check) whether it is configured with CSS to receive the system information on the active (DL) BWP.

In one implementation, the RRC message for on-demand SI request may be sent per SI message. For example, the UE may send the RRC message for on-demand SI request to ask for SI message #1. In another example, the UE may send the RRC message for on-demand SI request to ask for SI message #1 and SI message #2. In one implementation, the RRC message for on-demand SI request may be sent per SIB. For example, the UE may send the RRC message for on-demand SI request to ask for SIB #1. In another example, the UE may send the RRC message for on-demand SI request to ask for SIB #1 and SIB #2. In some implementations, whether the RRC message for on-demand SI request is SI message-based or SIB-based may depend on a network command (e.g., via dedicated signaling or system information) or depend on the SIB type that the UE requests. For example, after receiving an indication in a network command from the serving cell, the UE may determine to transmit the RRC message for on-demand SI request per required SIB or per SI message. If it is the RRC message for on-demand SI request per SI message, the UE may determine the SI message that includes the UE's required SIB based on the IE in SIB1 before transmitting the RRC message for on-demand SI request. After determining the SI message that includes the UE's required SIB, the UE may transmit the RRC message for on-demand SI request per SI message associated with the determined SI message. In one implementation, before the UE transmits the RRC message for on-demand SI request either per SIB or per SI message, the UE may monitor the CSS on the active BWP (and/or check the IE in SIB1) to determine whether the required SIB is broadcast. In one implementation, the UE may monitor the CSS on the active BWP for the required SI (e.g., SIB or SI message) that is broadcast. In one implementation, if the required SI is not broadcast, the UE may transmit an RRC message for on-demand SI request to the network.

After sending the RRC message for on-demand SI request to the network, the UE may receive an RRC Feedback for SI Request message (e.g., RRC Reconfiguration message) from the network. In one implementation, the UE may know whether the required SI will be sent via broadcast by the network when receiving the RRC Feedback for SI Request message.

The UE may try to receive the on-demand SI via broadcast after transmitting the RRC message for on-demand SI request to the network. In some implementations, the UE may try to receive the on-demand SI via broadcast after receiving the RRC Feedback for SI Request message. In some implementations, the UE may try to receive the on-demand SI via dedicated signaling after transmitting the RRC message for on-demand SI request to the network. In some implementations, the UE may try to receive the on-demand SI via dedicated signaling after receiving the RRC Feedback for SI Request message.

A set of Physical Downlink Control Channel (PDCCH) candidates to be monitored by a UE may be defined in terms of PDCCH search space sets. A search space set may be a CSS set or a UE-specific Search Space (US S) set. The UE may monitor PDCCH candidates in one or more of the following two search spaces sets:

(1) a Type0-PDCCH CSS set configured by pdcch-ConfigSIB1 IE in a Master Information Block (MIB) or by searchSpaceSIB1 IE in PDCCH-ConfigCommon IE or by searchSpaceZero in PDCCH-ConfigCommon IE, for a Downlink Control Information (DCI) format with Cyclic Redundancy Check (CRC) scrambled by a System Information Radio Network Temporary Identifier (SI-RNTI) on the primary cell of the Master Cell group (MCG). The searchSpaceZero IE may be used for an initial BWP only. It is assumed that the UE may (always) be configured with the Type-O-PDCCH CSS to receive SIB1.

(2) a Type0A-PDCCH CSS set configured by searchSpaceOtherSystemInformation IE in PDCCH-ConfigCommon IE, for a DCI format with CRC scrambled by an SI-RNTI on the primary cell of the MCG. The searchSpaceOtherSystemInformation IE may indicate an identifier (ID) of the search space for other SI (e.g., SIB2 and beyond). If the field (e.g., searchSpaceOtherSystemInformation IE) is absent, the UE may not receive the other SI in this BWP. In one implementation, the UE may be configured with CSS to receive other SI on the active DL BWP, via RRC message (e.g., RRC Reconfiguration message, RRC Resume message, RRC Setup message, RRC Feedback for SI Request message) by the network. In one implementation, the UE may be configured with CSS to receive other SI on the initial DL BWP, via SIB1 and/or RRC message (e.g., RRC Reconfiguration message, RRC Resume message, RRC Setup message, RRC Feedback for SI Request message) by the network.

For a DL BWP, if the UE is not provided with searchSpaceOtherSystemInformation IE for the Type0A-PDCCH CSS set, the UE may not monitor PDCCH for the Type0A-PDCCH CSS set on the DL BWP. Therefore, the UE may not receive the other SI on the DL BWP.

Case 1: Transmission of SI Request Message

Case 1-1: The UE is Configured with CSS to Receive the SI (e.g., Other SI) on the Active DL BWP In some implementations, if the UE is configured with CSS to receive the system information (e.g., SIB1, other SI) on the active DL BWP, the UE may monitor the CSS and read SIB1 to check whether the required SI is broadcast before transmitting an RRC message for on-demand SI request. If the required SI is not broadcast, the UE may transmit the RRC message for on-demand SI request.

Case 1-2: The UE is not Configured with CSS to Receive the SI (e.g., Other SI) on the Active DL BWP In some implementations, if the UE is not configured with CSS to receive the system information (e.g., other SI) on the active DL BWP, the UE may directly send an RRC message to the network without reading SIB1 to check whether the required SI is broadcast. In some implementations, if the UE is not configured with CSS to receive the system information (e.g., other SI) on the active DL BWP and the UE already knows that the cell (or the base station) supports to provide the required SI (e.g., by reading SIB1), the UE may directly send an RRC message to the network without reading SIB1 to check whether the required SI is broadcast. In one implementation, the UE may receive the SIB1 from the cell before transmitting the RRC message for on-demand SI request. The SIB1 may indicate whether the required SI (e.g., the required SIB or SI message) is provided by the cell. The UE in the RRC_CONNECTED state may transmit the RRC message for on-demand SI request to the cell after determining (by reading the SIB1) that the required SI is provided by the cell. The UE may not need to check whether the required SI is broadcast by the cell.

In some implementations, if the UE is not configured with CSS to receive the system information (e.g., other SI) on the active DL BWP, the UE may send an RRC message to the network after reading SIB1 to check whether the required SI is broadcast. In some implementations, if the UE is not configured with CSS to receive the system information (e.g., other SI) on the active DL BWP, and if the UE sends an RRC message to the network after reading SIB1, and if the UE receives a BWP switch indicator (e.g., a Medium Access Control (MAC) Control Element (CE), or a DCI) from the network, the UE may switch to the BWP indicated by the BWP switch indicator without receiving another RRC message from the network in response to the RRC message the UE sends to the network. In some implementations, if the UE is not configured with CSS to receive the system information (e.g., other SI) on the active DL BWP, and the UE sends an RRC message to the network after reading SIB1, and the UE receives a BWP switch indicator (e.g., a MAC CE, or a DCI) from the network, the UE may switch to the BWP indicated by the BWP switch indicator after receiving another RRC message from the network in response to the RRC message the UE sends to the network.

In one implementation, the RRC message may be an RRC message for on-demand SI request. The UE may indicate the required SI (e.g., the required SIB or SI message) in the RRC message for on-demand SI request to the network. In one implementation, the UE may indicate a request for configuring the CSS to receive the system information in the RRC message for on-demand SI request or another RRC message different from the RRC message for on-demand SI request.

In one implementation, in response to the RRC message sent by the UE, the network may send an RRC message (e.g., RRC Reconfiguration message, RRC Feedback for SI Request message) including the UE's required SI (e.g., the required SIB or SI message) to the UE.

In one implementation, in response to a request RRC message (for SI request) sent by the UE to the network, the network may send a response RRC message (e.g., RRC Reconfiguration message, RRC Feedback for SI Request message) including the CSS configuration (e.g., Type0A-PDCCH CSS) to the UE. The CSS configuration may be configured by searchSpaceOtherSystemInformation IE in PDCCH-ConfigCommon IE, which is included in the response RRC message sent by the network to the UE. In one implementation, in response to the request RRC message sent by the UE, the network may send a response RRC message including the command (or indication) of BWP switch. The response RRC message (e.g., RRC Reconfiguration message, RRC Feedback for SI Request message) may include the target BWP ID, and/or the CSS configuration on the target BWP. The target BWP may be an initial/default/another active BWP. For example, the network may command the UE to switch to the indicated BWP (e.g., the initial BWP or other BWP) configured with a CSS configuration for the UE to receive the requested other system information that is broadcast. After the UE performs BWP switch to the indicated BWP, the UE may check the SIB1 on the indicated BWP whether the requested SI message(s), SIB(s), and/or SIB segment(s) are broadcast, and/or receive the CSS/USS configuration of the indicated BWP in the SIB1 to receive the system information. The UE may configure itself with the CSS/USS configuration of the indicated BWP to receive the requested SI message(s), SIB(s), and/or SIB segment(s).

In one implementation, after receiving the response RRC message sent by the network, the UE may apply the content of the on-demand SI if the response RRC message includes the required SI (e.g., the required SIB or SI message).

In one implementation, after receiving the response RRC message sent by the network, the UE may configure itself with a CSS configuration to receive system information (e.g., other SI) if the response RRC message includes the CSS configuration. The UE may check the SIB1 to determine whether the required SI is broadcast. If the required SI is broadcast, the UE may receive the required SI based on the configuration in the SIB1 and the CSS configuration. If the required SI is not broadcast, the UE may send a request RRC message for on-demand SI request to the network. In one implementation, after receiving the response RRC message sent by the network, the UE may switch to the indicated BWP and may receive the required SI on the indicated BWP if the RRC message includes a BWP switch command. After the UE performs BWP switch to the indicated BWP, the UE may check the SIB1 on the indicated BWP to determine whether the requested SI message(s), SIB(s), and/or SIB segment(s) are broadcast, and/or receive the CSS/USS configuration of the indicated BWP in the SIB1 to receive the system information. The UE may configure itself with the CSS/USS configuration of the indicated BWP to receive the requested SI message(s), SIB(s), and/or SIB segment(s).

Case 2: RRC Message for On-Demand SI Request

The RRC message for on-demand SI request, which is sent by the UE to the network, may be per SI message based, per SIB based, and/or hybrid based.

In one implementation, the UE may (only) send a per SI message based RRC message for on-demand SI request to the network. In one implementation, the UE may (only) send a per SIB based RRC message for on-demand SI request. In one implementation, the UE may (only) send a hybrid based RRC message for on-demand SI request. The UE may indicate its required SI message, SIB and/or SIB segments in the hybrid based RRC message for on-demand SI request. For example, a SIB (e.g., a SIB for positioning feature, a positioning SIB (posSIB), a SIB including assistance data (AD) for positioning feature) may be segmented into several SIB segments. In one implementation, a SIB segment may be transmitted individually by the network (e.g., carried by different SI message(s)). In one implementation, several SIB segment(s) may be carried in one SI message. In one implementation, a SIB segment may be multiplexed in an SI window. In one implementation, an SI message may include SIB(s) with the same and/or different periodicities. In one implementation, an SI message may include SIB segment(s) with the same and/or different periodicities. For some features (e.g., positioning), the UE may need to acquire the information (e.g., positioning assistance data) in a SIB type by receiving all SIB segment(s) belonging to the SIB type. A SIB type for positioning may be defined for Global Navigation Satellite System (GNSS), while another SIB type for positioning may be defined for Observed Time Difference Of Arrival (OTDOA).

In one implementation, the UE may send per SI message based, per SIB based, and/or hybrid based RRC message for on-demand SI request in different conditions. If the UE intends to request SI message(s), the UE may send the per SIB based RRC message for on-demand SI request and/or hybrid based RRC message for on-demand SI request to the network. If the UE intends to request a SIB and/or SIB segment, the UE may send the per SIB based RRC message for on-demand SI request and/or hybrid based RRC message for on-demand SI request to the network.

In one implementation, the network may indicate to the UE (e.g., via broadcast) which types of RRC message for on-demand SI request it supports. For example, if the network indicates that it supports per SI message based and per SIB based RRC messages for on-demand SI request, the UE may send per SI message based and/or per SIB based RRC messages for on-demand SI request to the network.

In one implementation, an association between the features/slices (e.g., V2X, positioning, IIoT) and the types of RRC messages for on-demand SI request may be preconfigured/predefined to the UE. For example, the UE may know which types of RRC messages for on-demand SI request it can use for an on-demand SI request procedure by reading the slice information indicated (e.g., via broadcast and/or dedicated signaling) by the network, by reading the feature information indicated (e.g., via broadcast and/or dedicated signaling) by the network, and/or by the frequency on which the network operates (e.g., assuming that there is an association between the frequency and slices).

Case 2-1: per SI Message Based

In one implementation, the per SI message based RRC message for on-demand SI request may include a requested SI list. The requested SI list may be a bit string. The size of the requested SI list may be the maximum number of SI messages, which may be a predefined positive integer. A bit in the requested SI list may correspond to one SI message. According to the order of entries in the list of SI messages configured by schedulingInfoList IE in si-SchedulingInfo IE in the SIB1, the first bit of the requested SI list may correspond to the first/leftmost/last/rightmost listed SI message, the second bit of the requested SI list may correspond to the second listed SI message, and so on. If the UE requests one or more specific SI message(s), the UE may set the corresponding bit(s) to "1" in the requested SI list and transmit the per SI message based RRC message for on-demand SI request to the network.

In one implementation, the per SI message based RRC message for on-demand SI request may include an indicator that indicates whether the UE is configured with a CSS configuration (e.g., Type0A-PDCCH CSS) to receive system information (e.g., other SI). In one implementation, the indicator may be a Boolean format. If the indicator is "1", the UE may indicate that it is configured with a CSS configuration. If the indicator is "0" or absent, the UE may indicate that it is not configured with a CSS configuration. In one implementation, the indicator may be an ENUMERATED (Configured) format. If the indicator is "Configured", the UE may indicate that it is configured with a CSS configuration. If the indicator is not "Configured" or if the indicator is absent, the UE may indicate that it is not configured with a CSS configuration.

In one implementation, the per SI message based RRC message for on-demand SI request may include an indicator that indicates whether the UE is requesting the CSS configuration (e.g., Type0A-PDCCH CSS) to receive system information (e.g., other SI). In one implementation, the indicator may be a Boolean format. If the indicator is "1", the UE may indicate that it requests the CSS configuration. If the indicator is "0" or the indicator is absent, the UE may indicate that it does not request the CSS configuration. In one implementation, the indicator may be an ENUMERATED (CSS) format. If the indicator is "CS S", the UE may indicate that it requests the CSS configuration. If the indicator is not "CSS" or if the indicator is absent, the UE may indicate that it does not request the CSS configuration.

Case 2-2: per SIB Based

In one implementation, the per SIB based RRC message for on-demand SI request may include a requested SIB list. The requested SIB list may be a bit string. The size of the requested SIB may be the maximum number of SIB(s), which may be a predefined positive integer. A bit in the requested SIB list may correspond to one SIB. The first bit of the requested SIB list may correspond to the first/leftmost/last/rightmost listed SIB (e.g., beginning with SIB2), the second bit of the requested SIB list may correspond to the second listed SIB, and so on. If the UE requests one or more specific SIB(s), the UE may set the corresponding bit(s) to "1" in the requested SIB list and transmit the per SIB based RRC message for on-demand SI request to the network.

In one implementation, if segmentation of a SIB type is possible, the requested SIB list may be a bit string with the size of the maximum number of SIB(s), which may refer to the total number of SIB types. In one implementation, at least one requested SIB segment list(s) may be included in the per SIB based RRC message for on-demand SI request. The requested SIB segment list may be a bit string with a size of the maximum number of SIB segments, which may refer to the maximum number of SIB segments into which a SIB type can be segmented. The first bit of the requested SIB segment list may correspond to the first/leftmost/last/rightmost SIB segment of the requested SIB type, the second bit of the requested SIB segment list may correspond to the second SIB segment of the requested SIB type, and so on. The UE may indicate the requested SIB type via the requested SIB list and the requested corresponding SIB segments via the requested SIB segment list.

For example, if the UE requests the second and third segments of a SIB type X (e.g., X>=2), the UE may set the $(X-1)^{th}$ leftmost bit of the requested SIB list to "1" and set the second leftmost bit and the third leftmost bit of the requested SIB segment list to "1" in the RRC message for on-demand SI request. Afterward, the UE may send the RRC message for on-demand SI, which indicates the requested SIB segments of a SIB type, to the network. The UE may receive the requested SIB segments of the SIB type from the network.

FIG. 1A is a diagram illustrating an example RRC message 100 for on-demand SI request according to an example implementation of the present disclosure. The RRC message 100 may include a requested SIB list 102, which is a bit string with the size of the maximum number of SIB(s) that the UE can request on-demand. Each bit in the requested SIB list 102 may correspond to a SIB type except SIB1. For example, the first leftmost bit of the requested SIB list 102 may correspond to SIB2, the second leftmost bit of the requested SIB list 102 may correspond to SIB3, and so on. If the required SIB is SIB2, the first leftmost bit of the requested SIB list 102 may be set to "1". An association between the bits in the requested SIB list 102 and the SIB types is not limited thereto. In another example, the first leftmost bit of the requested SIB list 102 may correspond to SIB12, the second leftmost bit of the requested SIB list 102 may correspond to SIB13, and so on.

The RRC message 100 may also include a requested SIB segment list 104, which is a bit string with the size of the maximum number of SIB segments into which a (corresponding) SIB type can be segmented. Alternatively, the bit string may be with the size of the maximum number of SIB segments among all SIB types that the UE may request on-demand. Each bit in the requested SIB segment list 104 may correspond to a SIB segment. For example, if the UE requests the second and third segments of SIB2, the first leftmost bit of the requested SIB list 102 may be set to "1", and the second leftmost bit and the third leftmost bit of the requested SIB segment list 104 may be set to "1", as shown in FIG. 1.

In one implementation, posSIBs may be requested by the UE on a per SIB segment basis. For example, each bit of the requested SIB segment list 104 may correspond to a posSIB type.

In one implementation, in the RRC message for on-demand SI request, each bit in the requested SIB list may or may not correspond to a requested SIB segment list. The number of requested SIB segment lists in the RRC message for on-demand SI request may be zero, 1, . . . , or the maximum number of SIB types. In one implementation, the size of each requested SIB segment list may be the same, for example equal to the maximum number of supported SIB segments, which may be preconfigured/predefined. In one implementation, the size of each requested SIB segment list may be the same or different, depending on the maximum number of supported SIB segments for each corresponding SIB type, which may be preconfigured/predefined. If the UE sends the RRC message for on-demand SI request without any requested SIB segment lists, the UE may indicate that there is no request for specific SIB segments. Alternatively, if the UE sends the RRC message for on-demand SI request without any requested SIB segment lists, it may indicate that no SIB segment is associated with the requested SIB(s) in the RRC message for on-demand SI request.

Figure 1B:
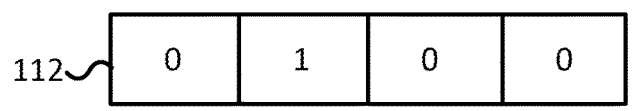
FIG. 1B is a diagram illustrating another example RRC message for on-demand SI request according to an example implementation of the present disclosure.
Figure 1B:
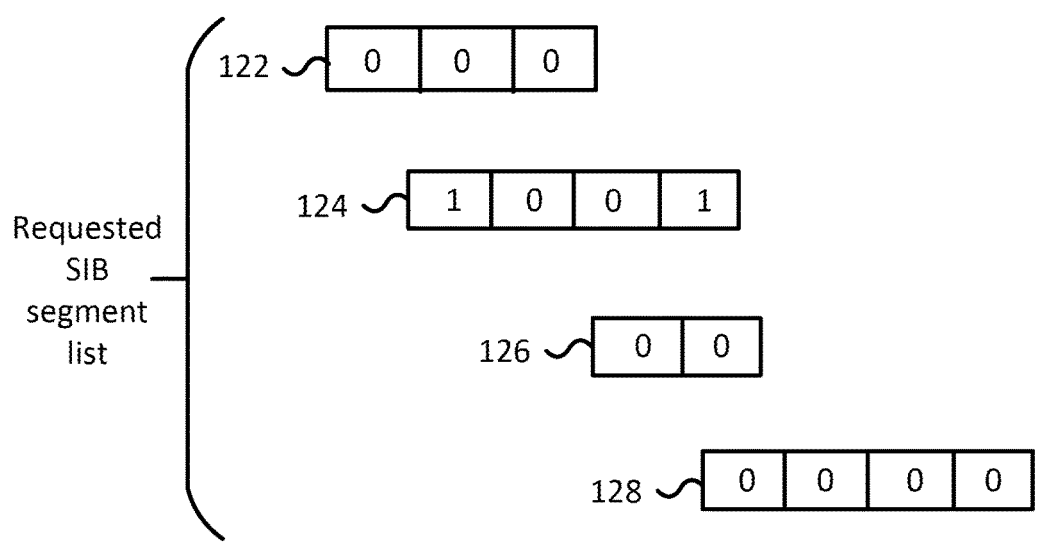

FIG. 1B is a diagram illustrating another example RRC message 110 for on-demand SI request according to an example implementation of the present disclosure. The RRC message 110 may include a requested SIB list 112, which is a bit string with the size of the maximum number of SIB(s) that the UE may request on-demand. Each bit in the requested SIB list 112 may correspond to a SIB type except SIB1. The RRC message may also include multiple requested SIB segment lists 122, 124, 126 and 128. Each SIB type is associated with a requested SIB segment list. For example, the first leftmost bit of the requested SIB list 112 is associated with the requested SIB segment list 122, the second leftmost bit of the requested SIB list 112 is associated with the requested SIB segment list 124, and so on. The size of each requested SIB segment list 122, 124, 126 and 128 may be different depending on the maximum number of supported SIB segments for each corresponding SIB type. The UE may indicate the requested SIB type and the requested SIB segment(s) by setting appropriate bits to "1" in the requested SIB list 112 and the requested SIB segment list 122, 124, 126 and 128.

In one implementation, the per SIB based RRC message for on-demand SI request may include the stored value tag and/or area scope information per SIB for the on-demand SIBs. When the network receives the indicated value tag and/or area scope information, the network may respond with SIB delta information to the UE accordingly (e.g., only providing modified SIB content to the UE if the indicated information is different from the network's valid information). Note that if the UE does not provide any value tag and/or area scope information during the on-demand SI request procedure, the network may by default provide the entire associated SIB content.

In one implementation, if segmentation of a SIB type is possible, the requested SIB list may be in an ENUMERATED format. Elements of the ENUMERATED format include possible SIB type(s) that the UE may request. In one implementation, at least one requested SIB segment list may be included in the per SIB based RRC message for on-demand SI request. The requested SIB segment list may be a bit string with the size of the maximum number of SIB segments, where the maximum number of SIB segments may refer to the maximum number of SIB segments into which a SIB type can be segmented. The first bit of the request SIB segment list may correspond to the first/leftmost/last/rightmost SIB segment of the requested SIB type, the second bit may correspond to the second SIB segment of the requested SIB type, and so on. The UE may indicate the requested SIB type via the requested SIB list (with ENUMERATED format) and the requested corresponding SIB segments via the requested SIB segment list. For example, if the UE requests the second and third segments of a SIB type X (e.g., X=2), the UE may set the requested SIB list to "sib-type-X" (e.g., X=2) where "sib-type-X" is one element of the requested SIB list. The UE may set the second leftmost bit and the third leftmost bit of the request SIB segment list to "1" in the RRC message for on-demand SI request. Afterward, the UE may send the RRC message for on-demand SI, which indicates the requested SIB segments of a SIB type to the network. The UE may receive the request SIB segments of a SIB type from the network.

In one implementation, if the UE sets the requested SIB list to "sib-type-X" (e.g., X=2) where "sib-type-X" is one element of the requested SIB list and the UE does not send the requested SIB segment list in the RRC message for on-demand SI request, the UE may indicate that it requests all segments of the SIB type X. In one implementation, if the UE sets the requested SIB list to "sib-type-X" (e.g., X=2) where "sib-type-X" is one element of the requested SIB list and a default value that indicates a request for all SIB segments corresponding to the requested SIB list in the RRC message for on-demand SI request, the UE may indicate that it requests all segments of the SIB type X.

In response to a reception of the RRC message for on-demand SI request without a requested SIB segment list (or with absent requested SIB segment list), the network may send all SIB segments of the UE's requested SIB type indicated by the requested SIB list in the RRC message for on-demand SI request. The UE may receive all SIB segments for the requested SIB type from the network.

In one implementation, the RRC message for on-demand SI request may include a list of pairs of a requested SIB list (with ENUMERATED format) and one or no requested SIB segment list. In each pair, a requested SIB segment list may correspond to a requested SIB list (with ENUMERATED format). The number of requested SIB segment lists in the RRC message for on-demand SI request may be 0, 1, . . . , or the maximum number of SIB types. The size of each requested SIB segment list may be the same, such as equal to the maximum number of supported SIB segments, which may be preconfigured/predefined. The size of each requested SIB segment list may be the same or different, depending on the maximum number of supported SIB segments for each corresponding SIB type, which may be preconfigured/predefined. If the UE sends the RRC message for on-demand SI request without a requested SIB segment list corresponding to a requested SIB type, the UE may indicate that there is no request for specific SIB segments for the requested SIB type (e.g., the UE may request the full SIB type).

In one implementation, posSIBs may be requested by the UE on a per SIB segment basis. The RRC message for on-demand SI request may include a list of pairs of a requested SIB list (with ENUMERATED format) and one or no requested SIB segment list. The requested SIB segment list corresponding to the requested SIB list may be a list of requested posSIBs with ENUMERATED format. The RRC message for on-demand SI request may indicate at least one of a list of requested SIBs with ENUMERATED format and a list of requested posSIBs with ENUMERATED format.

In one implementation, if segmentation of a SIB type is possible, the requested SIB list may be an INTEGER format. The range of the INTEGER format may be from a starting value (e.g., 2) to an ending value (e.g., the maximum number of SIB(s)), which indicates the possible SIB type(s) that the UE may request. For example, if the starting value is 2 (e.g., corresponding to SIB2), the ending value may be the maximum number of SIB(s) (e.g., corresponding to the last SIB). For another example, if the starting value is 1 (e.g., corresponding to SIB2), the ending value may be the maximum number of SIB(s) minus 1 (e.g., corresponding to the last SIB). In one implementation, at least one requested SIB segment list(s) may be included in the per SIB based RRC message for on-demand SI request. The requested SIB segment list may be a bit string with the size of the maximum number of SIB segments, which may refer to the maximum number of SIB segments into which a SIB type can be segmented. The first bit of the request SIB segment list may correspond to the first/leftmost/last/rightmost SIB segment of the requested SIB type, the second bit may correspond to the second SIB segment of the requested SIB type, and so on. The UE may indicate the requested SIB type via the requested SIB list (with INTEGER format) and the requested corresponding SIB segments via the requested SIB segment list. For example, if the UE requests the second and third segments of a SIB type X (e.g., X=2), the UE may set the requested SIB list to INTEGER X (or X−1) where INTEGER X (or X−1) may correspond to SIB type X. The UE may also set the second leftmost bit and the third leftmost bit of the requested SIB segment list to "1" in the RRC message for on-demand SI request. Afterward, the UE may send the RRC message for on-demand SI request, which indicates the requested SIB segments of a SIB type to the network. The UE may receive the request SIB segments of the SIB type from the network.

In one implementation, if the UE sends the requested SIB list to INTEGER X (or X−1) corresponding to SIB type X and does not send the requested SIB segment list in the RRC message for on-demand SI request, the UE may indicate that it requests all segments of the SIB type X. In one implementation, if the UE sends the requested SIB list to INTEGER X (or X−1) corresponding to SIB type X and does not send the requested SIB segment list in the RRC message for on-demand SI request, the UE may indicate that the required SIB(s) does not include SIB segment(s). In one implementation, if the UE sends the requested SIB list to INTEGER X (or X−1) corresponding to SIB type X and a default value that indicates a request for all SIB segments corresponding to the requested SIB list in the RRC message for on-demand SI request, the UE may indicate that it requests all segments of the SIB type X. In response to a reception of the RRC message for on-demand SI request without requested SIB segment list (or with absent requested SIB segment list), the network may send all SIB segments of the UE's requested SIB type indicated by the requested SIB list in the RRC message for on-demand SI request. The UE may receive all SIB segments for the requested SIB type from the network.

In one implementation, the RRC message for on-demand SI request may include a list of pairs of a requested SIB list (with INTEGER format) and one or no requested SIB segment list. In each pair, a requested SIB segment list may correspond to a requested SIB list (with INTEGER format). The number of requested SIB segment lists in the RRC message for on-demand SI request may be 0, 1, . . . , or the maximum number of SIB types. The size of each requested SIB segment list may be the same, such as equal to the maximum number of supported SIB segments, which may be preconfigured/predefined. The size of each requested SIB segment list may be the same or different, depending on the maximum number of supported SIB segments for each corresponding SIB type, which may be preconfigured/predefined. If the UE sends the RRC message for on-demand SI request without a requested SIB segment list corresponding to a requested SIB type, the UE may indicate that there is no request for specific SIB segments for the requested SIB type (e.g., the UE may request the full SIB type).

In one implementation, if segmentation of a SIB type is possible, the requested SIB list may be a bit string with the size of maximum number of SIB(s), where the maximum number of SIB(s) may refer to the total number of SIB types and SIB segments. For example, if there are 5 SIB types in other SI and one of the SIB types (e.g., SIB type 2) has 3 segments, the maximum number of SIB(s) may be 5−1+3=7. A bit in the requested SIB list may correspond to one SIB type or one SIB segment. The first bit may correspond to the first/leftmost/last/rightmost listed SIB type (e.g., beginning with SIB2) or SIB segment, the second bit may correspond to the second listed SIB type or SIB segment, and so on. For example, if SIB type 2 has 3 segments, the first bit of the bit string may refer to the first SIB segment of the SIB type 2, the second bit of the bit string may refer to the second SIB segment of the SIB type 2, the third bit of the bit string may refer to the third SIB segment of the SIB type 2, the fourth bit of the bit string may refer to the SIB type 3, the fifth bit of the bit string may refer to the SIB type 4, and so on. If the UE requests one or more specific SIB type(s) and/or SIB segment(s), the UE may set the corresponding bits to "1" in the requested SIB list and transmit the per SIB based RRC message for on-demand SI request to the network.

In one implementation, if segmentation of a SIB type is possible, the requested SIB list may be an ENUMERATED format with the size of the maximum number of SIB(s), which may refer to a sum of the number of SIB segments and the number of SIB types without SIB segments. For example, if there are 5 SIB types in other SI and one of the SIB types (e.g., SIB type 2) has 3 segments, the maximum number of SIB(s) may be 5−1+3=7. An element in the requested SIB list may correspond to one SIB type or one SIB segment. For example, the requested SIB list may be ENUMERATED {Sib-Type-X, Sib-Type-X+1-seg1, Sib-Type-X+1-seg2, Sib-Type-X+2}, with each element corresponding to SIB Type X, the first segment of SIB Type X+1, the second segment of SIB Type X+1, the SIB Type X+2, respectively. If the UE requests one specific SIB type(s) and/or SIB segment(s), the UE may set the requested SIB list as the corresponding element and transmit the per SIB based RRC message for on-demand SI request to the network.

In one implementation, if segmentation of a SIB type is possible, the requested SIB list may be in an ENUMERATED format with the size of the maximum number of SIB(s), which may refer to the total number of SIB types and SIB segments. For example, if there are 5 SIB types in other SI and one of the SIB types (e.g., SIB type 2) has 3 segments, the maximum number of SIB(s) may be 5+3=8. An element in the requested SIB list may correspond to one SIB type or one SIB segment. For example, ENUMERATED{Sib-Type-X, Sib-Type-X+1, Sib-Type-X+1-seg1, Sib-Type-X+1-seg2, Sib-Type-X+2} may refer to SIB Type X, SIB Type X+1, the first segment of SIB Type X+1, the second segment of SIB Type X+1, the SIB Type X+2, respectively. If the UE requests one specific SIB type(s) and/or SIB segment(s), the UE may set the requested SIB list as the corresponding element and transmit the per SIB based RRC message for on-demand SI request to the network. If the UE sets the requested SIB list as "Sib-Type-X+1" and transmits the RRC message for on-demand SI request to the network, the UE may request SIB Type X+1 (including all SIB segments of the SIB Type X+1). If the UE sets the requested SIB list as "Sib-Type-X+1-seg1" and transmits the RRC message for on-demand SI request to the network, the UE may request the first SIB segment of SIB Type X+1.

In one implementation, if segmentation of a SIB type is possible, the requested SIB list may be an INTEGER format with the range from 1 to the size of the maximum number of SIB(s), which may refer to a sum of the number of SIB segments and the number of SIB types without SIB segments. Alternatively, the range may be from 0 to the size of maximum number of SIB(s) minus 1. For example, if there are 5 SIB types in other SI and one of the SIB types (e.g., SIB type 2) has 3 segments, the maximum number of SIB(s) may be 5−1+3=7. For example, if the other SI includes SIB Type X, the first segment of SIB Type X+1, the second segment of SIB Type X+1, and SIB Type X+2, the corresponding INTEGER in the requested SIB list may be {0, 1, 2, 3} or {1, 2, 3, 4}. If the UE requests the first segment of SIB Type X+1, the UE may set the INTEGER to {1} or {2} in the requested SIB list and send the RRC message for on-demand SI request to the network.

In one implementation, if segmentation of a SIB type is possible, the requested SIB list may be an INTEGER format with the range from 1 to the size of the maximum number of SIB(s), which may refer to the total number of SIB types and SIB segments. Alternatively, the range may be from 0 to the size of the maximum number of SIB(s) minus 1. For example, if there are 5 SIB types in other SI and one of the SIB types (e.g., SIB type 2) has 3 segments, the maximum number of SIB(s) may be 5+3=8. For example, if the other SI includes SIB Type X, SIB Type X+1, the first segment of SIB Type X+1, the second segment of SIB Type X+1, and SIB Type X+2, the corresponding INTEGER in the requested SIB list may be {0, 1, 2, 3, 4} or {1, 2, 3, 4, 5}. If the UE requests the first segment of SIB Type X+1, the UE may set the INTEGER to {2} or {3} in the requested SIB list and send the RRC message for on-demand SI request to the network. If the UE requests the SIB Type X+1 (including all SIB segments), the UE may set the INTEGER to {1} or {2} in the requested SIB list and send the RRC message for on-demand SI request to the network.

In one implementation, the per SIB message based RRC message for on-demand SI request may include an indicator to indicate whether the UE is configured with a CSS configuration (e.g., Type0A-PDCCH CSS) to receive system information (e.g., other SI). In one implementation, the indicator may be a Boolean format. If it is "1", the UE may indicate that it is configured with a CSS configuration. If it is "0" or absent, the UE may indicate that it is NOT configured with a CSS configuration. In one implementation, the indicator may be an ENUMERATED (Configured) format. If it is "Configured", the UE may indicate that it is configured with a CSS configuration. If it is not "Configured" or if it is absent, the UE may indicate that it is not configured with a CSS configuration.

In one implementation, the per SIB message based RRC message for on-demand SI request may include an indicator to indicate whether the UE is requesting the CSS configuration (e.g., Type0A-PDCCH CSS) to receive system information (e.g., other SI). In one implementation, the indicator may be a Boolean format. If it is "1", the UE may indicate that it requests a CSS configuration. If it is "0" or absent, the UE may indicate that it does not request a CSS configuration. In one implementation, the indicator may be an ENUMERATED (CSS) format. If it is "CSS", the UE may indicate that it requests a CSS configuration. If it is not "CSS" or if it is absent, the UE may indicate that it does not request a CSS configuration.

Case 2-3: Hybrid Based

In one implementation, the hybrid based RRC message for on-demand SI request may include a requested SI list, a requested SIB list, a requested SIB segment list, an indicator to indicate whether the UE is configured with a CSS configuration (e.g., Type0A-PDCCH CSS) to receive system information (e.g., other SI), and/or an indicator to indicate whether the UE is requesting the CSS configuration (e.g., Type0A-PDCCH CSS) to receive system information (e.g., other SI). The detailed design and the UE behavior of the corresponding information/configuration may refer to the design for per SI message based RRC message for on-demand SI request and per SIB based RRC message for on-demand SI request. If the UE requests at least two of SI message, SIB type, and/or SIB segment, the UE may send a hybrid based RRC message for on-demand SI request to the network. If the requested SI list is absent in the hybrid based RRC message for on-demand SI request, the UE may not request an SI message. If the requested SIB list is absent in the hybrid based RRC message for on-demand SI request, the UE may not request a specific SIB(s). If the requested SIB segment list is absent in the hybrid-based RRC message for on-demand SI request, the UE may not request a specific SIB segment(s). If the hybrid based RRC message for on-demand SI request is adopted, the UE may adjust the content (or information element) of the hybrid based RRC message based on the SI message(s), SIB type(s), and/or SIB segment(s) that it requests.

In one implementation, an RRC layer of the UE may create the RRC message for on-demand SI request. For UL, the RRC message for on-demand SI request may be sent to a Radio Link Control (RLC) Acknowledgement Mode (AM) entity to build an RLC AM protocol data unit (PDU) and carried via signaling radio bearer 1 (SRB1) (from the UE to the PCell) or via SRB3 (from the UE to the PSCell). The RLC AM PDU may be transmitted as a (new) UL-DCCH message to the Medium Access Control (MAC) entity.

In one implementation, the RRC layer of the UE may send the RRC message for on-demand SI request to a lower layer of the UE for an RLC AM entity of the UE to build an RLC AM PDU that includes the RRC message for on-demand SI request. The RLC AM entity of the UE may send the RLC AM PDU to the MAC entity of the UE in an uplink dedicated control channel (UL-DCCH) over SRB1. The MAC entity of the UE may send a transport block including the RLC AM PDU to the physical layer of the UE. The physical layer of the UE may transmit the physical resources (e.g., Physical Uplink Shared Channel (PUSCH)) including the transport block to the serving cell. The RRC layer of the UE may send the RRC PDU including the RRC message for on-demand SI request to the Packet Data Convergence Protocol (PDCP) layer of the UE. The PDCP layer of the UE may send the PDCP PDU including the RRC PDU to the RLC AM entity of the UE.

In one implementation, the RRC message for on-demand SI request may be added as one type of a UL-DCCH message. Table 1 below shows an example data structure of a UL-DCCH message where the RRC message for on-demand SI request belongs to the UL-DCCH message type c1.

TABLE 1

```
-- ASN1START
-- TAG-UL-DCCH-MESSAGE-START
UL-DCCH-Message ::=            SEQUENCE {
   message                        UL-DCCH-MessageType
}
UL-DCCH-MessageType ::=        CHOICE {
   c1                             CHOICE {
      measurementReport              MeasurementReport,
      rrcReconfigurationComplete     RRCReconfigurationComplete,
      rrcSetupComplete               RRCSetupComplete,
      rrcReestablishmentComplete     RRCReestablishmentComplete,
      rrcResumeComplete              RRCResumeComplete,
      securityModeComplete           SecurityModeComplete,
      securityModeFailure            SecurityModeFailure,
      ulInformationTransfer          ULInformationTransfer,
      locationMeasurementIndication  LocationMeasurementIndication,
      ueCapabilityInformation        UECapabilityInformation,
      counterCheckResponse           CounterCheckResponse,
      ueAssistanceInformation        UEAssistanceInformation,
      failureInformation             FailureInformation,
      ulInformationTransferMRDC      ULInformationTransferMRDC,
      scgFailureInformation          SCGFailureInformation,
      scgFailureInformationEUTRA     SCGFailureInformationEUTRA
      rrcMessageForOnDemandSIRequest RRCMessageForOnDemandSIRequest
   },
   messageClassExtension          SEQUENCE { }
}
-- TAG-UL-DCCH-MESSAGE-STOP
-- ASN1STOP
```

In one implementation, the RRC message for on-demand SI request may be added as part of the messageClassExtention IE. Table 2 below shows an example data structure of a UL-DCCH message where the RRC message for on-demand SI request does not belong to the UL-DCCH message type c1.

TABLE 2

```
-- ASN1START
-- TAG-UL-DCCH-MESSAGE-START
UL-DCCH-Message ::=                    SEQUENCE {
    message                                UL-DCCH-MessageType
}
UL-DCCH-MessageType ::=                CHOICE {
    c1                                     CHOICE {
        measurementReport                      MeasurementReport,
        rrcReconfigurationComplete             RRCReconfigurationComplete,
        rrcSetupComplete                       RRCSetupComplete,
        rrcReestablishmentComplete             RRCReestablishmentComplete,
        rrcResumeComplete                      RRCResumeComplete,
        securityModeComplete                   SecurityModeComplete,
        securityModeFailure                    SecurityModeFailure,
        ulInformationTransfer                  ULInformationTransfer,
        locationMeasurementIndication          LocationMeasurementIndication,
        ueCapabilityInformation                UECapabilityInformation,
        counterCheckResponse                   CounterCheckResponse,
        ueAssistanceInformation                UEAssistanceInformation,
        failureInformation                     FailureInformation,
        ulInformationTransferMRDC              ULInformationTransferMRDC,
        scgFailureInformation                  SCGFailureInformation,
        scgFailureInformationEUTRA             SCGFailureInformationEUTRA
    },
    rrcMessageForOnDemandSIRequest RRCMessageForOnDemandSIRequest
}
-- TAG-UL-DCCH-MESSAGE-STOP
```

In one implementation, a new UL-DCCH message (different from the legacy UL-DCCH message) (e.g., referred to as UL-DCCH1 message in the present disclosure) for the RRC message for on-demand SI request may be created. The new UL-DCCH may be a point-to-point bi-directional channel that transmits dedicated control information between a UE and the network. The new UL-DCCH may be used by UEs having an RRC connection. The new UL-DCCH may be mapped to Uplink Shared Channel (UL-SCH). The new UL-DCCH may support the on-demand SI request for individual SI message, SIB, and/or SIB segments. Table 3 below shows an example data structure of the UL-DCCH1 message.

TABLE 3

```
-- ASN1START
-- TAG-UL-DCCH1-MESSAGE-START
UL-DCCH1-Message ::=                   SEQUENCE {
    message                                UL-DCCH1-MessageType
}
UL-DCCH1-MessageType ::=               CHOICE {
    c1                                     CHOICE {
        rrcMessageForOnDemandSIRequest RRCMessageForOnDemandSIRequest
        spare3 NULL,
        spare2 NULL,
        spare1 NULL
    },
    messageClassExtension                  SEQUENCE { }
}
-- TAG-UL-DCCH1-MESSAGE-STOP
-- ASN1STOP
```

Case 3: UE Behavior After Sending the RRC Message for On-Demand SI Request

In one implementation, after sending the RRC message for on-demand SI request, the UE may keep monitoring the CSS/USS for the requested SI message(s), SIB(s), and/or SIB segment(s). In some implementations, the UE may try to receive the on-demand SI via broadcast after receiving the RRC Feedback for SI Request message. In one implementation, after sending the RRC message for on-demand SI request, the UE may keep monitoring the CSS/USS for the requested SI message(s), SIB(s), and/or SIB segment(s). In some implementations, the UE may try to receive the on-demand SI via broadcast after receiving the RRC Feedback for SI Request message. In one implementation, after sending the RRC message for on-demand SI request, if the UE is configured with CSS in the active BWP, the UE may monitor the configured CSS for the reception of the required SI message(s), SIB(s), and/or SIB segment(s).

In one implementation, the UE may be configured with a USS in an active BWP when the UE is not configured with a CSS in the active BWP. An RRC message that carries the required SI (e.g., the required SIB, SIB segment, or SI message) may be transmitted on the USS. After transmitting the RRC message for on-demand SI request, the UE may monitor the configured USS for the reception of the RRC message that carries the required SI.

In one implementation, after sending the RRC message for on-demand SI request, if the UE receives an RRC message (or broadcast message) indicating that the requested SI message(s), SIB(s), and/or SIB segment(s) will be transmitted (or are transmitted) by the network, the UE may keep monitoring the CSS/USS for the requested SI message(s), SIB(s), and/or SIB segment(s).

In one implementation, after sending the RRC message for on-demand SI request, if the UE receives an RRC message indicating that the requested SI message(s), SIB(s), and/or SIB segment(s) will not be broadcast by the network, the UE may stop monitoring the CSS for the corresponding requested SI message(s), SIB(s), and/or SIB segment(s).

In one implementation, after sending the RRC message for on-demand SI request, if the UE receives the RRC message indicating that the requested SI message(s), SIB(s), and/or SIB segment(s) will be unicast by the network, the UE may stop monitoring USS for the corresponding requested SI message(s), SIB(s), and/or SIB segment(s).

In one implementation, after sending the RRC message for on-demand SI request, the UE may not send an RRC message for on-demand SI request to request other SI message(s), SIB(s), and/or SIB segment(s) before receiving the requested SI message(s), SIB(s), and/or SIB segment(s).

In one implementation, after sending the RRC message for on-demand SI request, the UE may start a prohibit timer. The UE may not send an RRC message for on-demand SI request until the prohibit timer expires. The initial value of the prohibit timer may be configured by the network (e.g., via dedicated signaling or broadcast) or may be a (preconfigured/predefined) default value. The network may configure the UE with the initial value of the prohibit timer before the UE transmits the RRC message for on-demand SI request. The UE may stop the prohibit timer when the UE switches the BWP or receives the RRC message (e.g., RRC Feedback for SI Request message, RRC Reconfiguration) and/or broadcast message indicating that the requested SI message(s), SIB(s), and/or SIB segment(s) will be transmitted (or are (being) transmitted) by the network. The UE may stop the prohibit timer when the UE receives the requested SI message(s), SIB(s), and/or SIB segment(s). In some implementations, the prohibit timer may be applied only when the RRC message for on-demand SI request is transmitted when the UE is in the RRC_CONNECTED state. The prohibit timer may not be applied when the RRC message for on-demand SI request is transmitted when the UE is in the RRC_IDLE/RRC_INACTIVE state.

Case 4: Feedback Message

In response to the RRC message for on-demand SI request sent by the UE to the network, the network may send an RRC Feedback for SI Request message to the UE. The UE may receive the RRC Feedback for SI Request message, which may be carried via DL-DCCH (from the MAC entity of the UE to the RLC AM layer of the UE), and via SRB1 (if the network is a PCell) or via SRB3 (if the network is a PSCell). The UE may monitor the USS for the reception of the RRC Feedback for SI Request message.

In one implementation, after transmitting the RRC message for on-demand SI request including the request of SI message(s), SIB(s), and/or SIB segment(s), the UE may receive an RRC Feedback for SI Request message from the network, which may include the UE's requested SI message(s), SIB(s), and/or SIB segment(s). If the UE receives the RRC Feedback for SI Request message including its requested SI message(s), SIB(s), and/or SIB segment(s), it implies that the network will not broadcast the UE's requested SI message(s), SIB(s), and/or SIB segment(s). If the UE receives the RRC Feedback for SI Request message including its requested SI message(s), SIB(s), and/or SIB segment(s), the UE may stop or keep monitoring the CSS for the requested SI message(s), SIB(s), and/or SIB segment(s). If the UE receives the RRC Feedback for SI Request message not including all its requested SI message(s), SIB(s), and/or SIB segment(s), the UE may keep monitoring or start monitoring the CSS/USS for the requested SI message(s), SIB(s), and/or SIB segment(s).

In one implementation, after transmitting the RRC message for on-demand SI request including the request of SI message(s), SIB(s), and/or SIB segment(s), the UE may receive an RRC Feedback for SI Request message from the network, which may include an indicator to indicate that the network will broadcast (or is broadcasting) the UE's requested SI message(s), SIB(s), and/or SIB segment(s). In one implementation, the indicator may be a Boolean format. If the indicator is "1", the network indicates that it will broadcast (or is broadcasting) the UE's requested SI message(s), SIB(s), and/or SIB segment(s). In one implementation, the indicator may be an ENUMERATED ("broadcast") format. If the indicator is "broadcast", the network indicates that it will broadcast (or is broadcasting) the UE's requested SI message(s), SIB(s), and/or SIB segment(s). If the indicator is absent or not "broadcast", the network indicates that it will not broadcast the UE's requested SI message(s), SIB(s), and/or SIB segment(s). The UE may receive another RRC message (e.g., RRC Reconfiguration message) including the UE's requested SI message(s), SIB(s), and/or SIB segment(s) after the reception of the RRC Feedback for SI Request message. If the indicator indicates that the network will broadcast (or is broadcasting) the requested SI message(s), SIB(s), and/or SIB segment(s), the UE may monitor the CSS for DCI format 1_0 with CRC scrambled by SI-RNTI to derive the time/frequency resources for receiving the required SI message(s), SIB(s), and/or SIB segment(s).

In one implementation, after transmitting the RRC message for on-demand SI request including the request of SI message(s), SIB(s), and/or SIB segment(s), the UE may receive an RRC Feedback for SI Request message (or an RRC Reconfiguration message) from the network, which may include the CSS configuration (e.g., Type0A-PDCCH CSS) for receiving system information. In one implementation, the CSS configuration (e.g., Type0A-PDCCH CSS) may be configured by searchSpaceOtherSystemInformation IE in PDCCH-ConfigCommon IE, which is included in the RRC Feedback for SI Request message (or the RRC Reconfiguration message). In one implementation, the UE may configure itself with the received CSS configuration (e.g., replace the previous CSS configuration if any) and monitor the CSS for DCI format 1_0 with CRC scrambled by SI-RNTI to derive the time/frequency resources for receiving the required SI message(s), SIB(s), and/or SIB segment(s). In one implementation, the reception of RRC Feedback for SI Request message (or RRC Reconfiguration message) implies that the network will broadcast (or is broadcasting) the requested SI message(s), SIB(s), and/or SIB segment(s). Upon receiving the RRC Feedback for SI Request message (or RRC Reconfiguration), the UE may keep monitoring the CSS for the reception of the requested SI message(s), SIB(s), and/or SIB segment(s).

In one implementation, after transmitting the RRC message for on-demand SI request including an indicator to indicate whether the UE is configured with a CSS configuration (e.g., Type0A-PDCCH CSS) to receive system information (e.g., other SI), the UE may receive an RRC Feedback for SI Request message (or an RRC Reconfiguration message) from the network, which may include the CSS configuration (e.g., Type0A-PDCCH CSS) to receive system information. In one implementation, the CSS configuration (e.g., Type0A-PDCCH CSS) may be configured by searchSpaceOtherSystemInformation IE in PDCCH-ConfigCommon IE, which is included in the RRC Feedback for SI Request message (or the RRC Reconfiguration message).

In one implementation, if the UE has indicated that it is configured with a CSS configuration in the RRC message for on-demand SI request, and if the UE receives a CSS configuration in RRC Feedback for SI Request message, the UE may configure itself with the received CSS configuration (e.g., replace the previous CSS configuration if any) and monitor the CSS for DCI format 1_0 with CRC scrambled by SI-RNTI to derive the time/frequency resources to receive the required SI message(s), SIB(s), and/or SIB segment(s).

In one implementation, if the UE has indicated that it is not configured with a CSS configuration in the RRC message for on-demand SI request, and if the UE receives a CSS configuration in RRC Feedback for SI Request message, the UE may configure itself with the received CSS configuration and monitor the CSS for DCI format 1_0 with CRC scrambled by SI-RNTI to derive the time/frequency resources to receive the required SI message(s), SIB(s), and/or SIB segment(s).

In one implementation, if the UE has indicated that it is configured with a CSS configuration in the RRC message for on-demand SI request, and if the UE does not receive a CSS configuration in RRC Feedback for SI Request message, the UE may monitor the CSS (which the UE indicates to the network via the RRC message for on-demand SI request) for DCI format 1_0 with CRC scrambled by SI-RNTI to derive the time/frequency resources to receive the required SI message(s), SIB(s), and/or SIB segment(s).

In one implementation, if the UE has indicated that it is not configured with a CSS configuration in the RRC message for on-demand SI request, and if the UE does not receive a CSS configuration in RRC Feedback for SI Request message, the UE may implicitly know that the network will not broadcast the requested SI message(s), SIB(s), and/or SIB segment(s). If the UE is configured with a USS, the UE may monitor the USS for the reception of the requested SI message(s), SIB(s), and/or SIB segment(s) (e.g., the UE may monitor the USS for the reception of an RRC message including the SI message(s), SIB(s), and/or SIB segment(s)). In one implementation, if the UE has indicated that it is not configured with a CSS configuration in the RRC message for on-demand SI request, and if the UE does not receive a CSS configuration in RRC Feedback for SI Request message, the UE may receive the requested SI message(s), SIB(s), and/or SIB segment(s) together in the same RRC Feedback for SI Request message. In one implementation, if the UE has indicated that it is not configured with a CSS configuration in the RRC message for on-demand SI request, and if the UE does not receive a CSS configuration in RRC Feedback for SI Request message, the UE may expect to receive the requested SI message(s), SIB(s), and/or SIB segment(s) in another RRC message (e.g., RRC Reconfiguration message).

In one implementation, after transmitting the RRC message for on-demand SI request including an indicator to indicate whether the UE is requesting the CSS configuration (e.g., Type0A-PDCCH CSS) to receive system information (e.g., other SI), the UE may receive an RRC Feedback for SI Request message (or an RRC Reconfiguration message) from the network, which may include the CSS configuration (e.g., Type0A-PDCCH CSS) to receive system information. In one implementation, if the UE has indicated that it is requesting the CSS configuration in the RRC message for on-demand SI request, and if the UE receives the CSS configuration in RRC Feedback for SI Request message, the UE may configure itself with the received CSS configuration and monitor the CSS for DCI format 1_0 with CRC scrambled by SI-RNTI to derive the time/frequency resources to receive the required SI message(s), SIB(s), and/or SIB segment(s).

In one implementation, if the UE has indicated that it is requesting the CSS configuration in the RRC message for on-demand SI request, and if the UE does not receive the CSS configuration in RRC Feedback for SI Request message, the UE may implicitly know that the network will not broadcast the requested SI message(s), SIB(s), and/or SIB segment(s). If the UE is configured with USS, the UE may monitor the USS for the reception of the requested SI message(s), SIB(s), and/or SIB segment(s) (e.g., the UE may monitor the USS for the reception of an RRC message including the SI message(s), SIB(s), and/or SIB segment(s)). In one implementation, if the UE has indicated that it is requesting the CSS configuration in the RRC message for on-demand SI request, and if the UE does not receive a CSS configuration in RRC Feedback for SI Request message, the UE may receive the requested SI message(s), SIB(s), and/or SIB segment(s) together in the same RRC Feedback for SI Request message. In one implementation, if the UE has indicated that it is requesting the CSS configuration in the RRC message for on-demand SI request, and if the UE does not receive a CSS configuration in RRC Feedback for SI Request message, the UE may expect to receive the requested SI message(s), SIB(s), and/or SIB segment(s) in another RRC message (e.g., RRC Reconfiguration message).

In one implementation, if the UE has indicated that it is not requesting the CSS configuration in the RRC message for on-demand SI request, the UE may not receive the CSS configuration in RRC Feedback for SI Request message. In one implementation, if the UE has indicated that it is not requesting the CSS configuration in the RRC message for on-demand SI request, and if the UE receives the CSS configuration in RRC Feedback for SI Request message, the UE may configure itself with the received CSS configuration (e.g., replace the previous CSS configuration, if any) and monitor the CSS for DCI format 1_0 with CRC scrambled by SI-RNTI to derive the time/frequency resources to receive the required SI message(s), SIB(s), and/or SIB segment(s).

In one implementation, the UE may receive portions of the requested SI message(s), SIB(s), and/or SIB segment(s) via broadcast (e.g., by monitoring the CSS for DCI format 1_0 with CRC scrambled by SI-RNTI to derive the time/frequency resources to receive portions of the requested SI message(s), SIB(s), and/or SIB segment(s)), and receive other portions of the requested SI message(s), SIB(s), and/or SIB segment(s) via unicast/dedicated signaling (e.g., via RRC Reconfiguration message, via RRC Feedback for SI Request message). For example, the SIB(s) in an SI message transmitted via dedicated signaling may be different from the SIB(s) in an SI message transmitted via broadcast. In some implementations, the UE may stop monitoring the CSS/USS for the requested SI message(s), SIB(s), and/or SIB segment(s) if all the requested SI message(s), SIB(s), and/or SIB segment(s) are received via dedicated signaling or broadcast.

In some implementations, the UE may continue monitoring the CSS/USS for the requested SI message(s), SIB(s), and/or SIB segment(s) if there is no additional command from the network. In other words, the UE may determine whether to continue monitoring the CSS/USS for the requested SI message(s), SIB(s), and/or SIB segment(s) based on an additional command from the network. In one implementation, the UE may be configured by the network to perform an on-demand SI request procedure. For example, the UE may receive an RRC message that indicates whether the UE is allowed to request SI (e.g., SI message(s), SIB(s), SIB segment(s)) on-demand. The UE may continue monitoring the CSS/USS for the requested SI if the network does not send a command to disallow the UE from performing the on-demand SI request procedure (or if the UE does not receive a command from the network indicating whether the UE is allowed to perform the on-demand SI request procedure). The UE may continue monitoring the CS S/US S for the requested SI if the UE receives a command from the network indicating that the UE is allowed to perform the on-demand SI request procedure. The UE may stop monitoring the CSS/USS for the requested SI if the UE receives a command from the network indicating that the UE is not allowed to perform the on-demand SI request procedure.

In one implementation, the network may perform an RRC reconfiguration procedure (e.g., via sending the RRC Reconfiguration message) to cancel/remove/release the CSS/USS configuration at the UE side once it provides the UE with the requested SI message(s), SIB(s), and/or SIB segment(s). The RRC Reconfiguration message may include a cancellation indicator associated with the corresponding CSS/USS configuration. The UE may send the RRC Reconfiguration Complete message to the network if the UE cancels/removes/releases the CSS/USS configuration corresponding to the cancellation indicator; otherwise, the UE will follow the existing CSS/USS configuration to continue monitoring the CSS/USS for the requested SI message(s), SIB(s), and/or SIB segment(s). It is noted that the cancellation indicator may be a list of cancellation information, such as a list of search space identities. The UE may remove/release the CSS/USS associated with the cancellation information.

In one implementation, the UE may receive an indicator appended in its requested SI message(s), SIB(s), and/or SIB segment(s) to terminate the CSS/USS configuration. Upon receiving the requested SI message(s), SIB(s), and/or SIB segment(s) with the appended indicator, the UE may terminate the corresponding CSS/USS configuration for receiving the corresponding requested SI message(s), SIB(s), and/or SIB segment(s).

In one implementation, if the UE sends the SIB based and/or hybrid based RRC message for on-demand SI request (e.g., SI request per SIB, SI request per SIB segment), the UE may receive the entire SI message including the requested SIB(s) and/or SIB segment(s), via broadcast (e.g., by monitoring the CSS for DCI format 1_0 with CRC scrambled by SI-RNTI to derive the time/frequency resources to receive the SI message) or via dedicated signaling (e.g., RRC Reconfiguration message, RRC Feedback for SI Request message). In one implementation, the UE may monitor the USS to derive the time/frequency resources to receive the dedicated signaling.

In one implementation, if the UE sends the SIB based and/or hybrid based RRC message for on-demand SI request (e.g., SI request per SIB), the UE may receive all SIB segment(s) corresponding to the requested SIB(s), via broadcast (e.g., by monitoring the CSS for DCI format 1_0 with CRC scrambled by SI-RNTI to derive the time/frequency resources to receive the SI message) or via dedicated signaling (e.g., RRC Reconfiguration message, RRC Feedback for SI Request message). In one implementation, the UE may monitor the USS to derive the time/frequency resources to receive the dedicated signaling.

In one implementation, if the UE sends the SIB based and/or hybrid based RRC message for on-demand SI request (e.g., SI request per SIB segment), the UE may receive the SIB(s) including the requested SIB segment(s), via broadcast (e.g., by monitoring the CSS for DCI format 1_0 with CRC scrambled by SI-RNTI to derive the time/frequency resources to receive the SI message) or via dedicated signaling (e.g., RRC Reconfiguration message, RRC Feedback for SI Request message). In one implementation, the UE may monitor the USS to derive the time/frequency resources to receive the dedicated signaling.

In one implementation, the UE may not receive the RRC Feedback for SI Request message after transmitting the RRC message for on-demand SI Request. In one implementation, if the UE is configured with CSS to receive system information on the active BWP, after the UE sends the RRC message for on-demand SI request, the UE may monitor the configured CSS for the DCI format 1_0 with CRC scrambled by SI-RNTI to derive the time/frequency resources for the reception of the required SI message(s), SIB(s), and/or SIB segment(s).

In one implementation, if the UE receives the requested SI message(s), SIB(s), and/or SIB segment(s) via broadcast or dedicated signaling, the UE may stop monitoring the CSS to derive the DCI format 1_0 with CRC scrambled by SI-RNTI, stop monitoring the time/frequency resource to receive the system information (e.g., other SI), and/or stop monitoring the SI window. In one implementation, if the UE is configured with the CSS in the active BWP, the UE may stop monitoring the CSS during the SI window after receiving the required SI.

Case 5: SI Change Update for Other SI

In one implementation, if the UE has an active BWP with CSS configured to monitor system information, the UE may be configured with CSS to monitor paging (on the same active BWP). The UE may monitor for SI change indication in any paging occasion at least once per modification period. The UE may receive the CSS for paging together with the CSS for system information in the same RRC message. For example, if the UE receives the CSS configuration for system information from an RRC message (e.g., RRC Feedback for SI Request message, RRC Reconfiguration message), the UE may receive the CSS configuration for paging monitoring in the same RRC message.

In one implementation, the UE may receive the SI change indicator in an RRC message (e.g., RRC Feedback for SI Request message, RRC Reconfiguration message) from the network. Upon receiving the SI change indicator, the UE may check whether the requested SI message is updated by comparing the corresponding System Information Area ID and/or the corresponding value tag. Upon receiving the SI change indicator, the UE may check whether the requested SIB(s) (or SIB segment(s)) is updated by comparing the corresponding value tag, Area Scope, and/or System Information Area ID. In one implementation, the UE may compare the value tag, Area Scope, and/or System Information Area ID of stored SI message(s), SIB(s), and/or SIB segment(s) with the corresponding value tag, Area Scope, and/or System Information Area ID included in the SI change indicator.

In one implementation, upon receiving the SI change indicator, the UE may send the RRC message for on-demand request to the network to request the required (updated) SI message(s), SIB(s), and/or SIB segment(s). The UE may provide the value tag, Area Scope and/or System Information Area ID of the requested SI message(s), SIB(s), and/or SIB segment(s) to the network in the RRC message (e.g., RRC message for on-demand SI request). After transmitting the RRC message (e.g., RRC message for on-demand SI request), the UE may receive the updated version of the requested SI message(s), SIB(s), and/or SIB segment(s), or receive the updated part (e.g., delta signaling) of the requested SI message(s), SIB(s), and/or SIB segment(s), via broadcast (by monitoring the CSS to receive system information) and/or via dedicated signaling (e.g., RRC message, RRC Reconfiguration message, RRC Feedback for SI Request message). In one implementation, the UE may monitor the USS to receive the dedicated signaling.

In one implementation, if the UE requests the system information per SIB (or per SI message, or per SIB segment), the network may send the updated SIB (or SI message, or SIB segment) whenever the SIB is updated to the UE. The network may send the updated SIB (or SI message, or SIB segment) via broadcast and/or via dedicated signaling (e.g., RRC Reconfiguration message, RRC Feedback for SI Request message).

In one implementation, if the UE (always) requires the latest information of some specific SI message(s), SIB(s), and/or SIB segment(s), the UE may set an indicator associated with the requested SI message(s), SIB(s), and/or SIB segment(s) in the RRC message for on-demand SI request when the UE sends the RRC message for on-demand SI request to the network. The indicator may be a Boolean format. If it is "1", the UE may indicate that it requests the network to always provide the updated associated SI message(s), SIB(s), and/or SIB segment(s) whenever the associated SI message(s), SIB(s), and/or SIB segment(s) are updated. The UE may receive the updated associated SI message(s), SIB(s), and/or SIB segment(s) via broadcast (e.g., by keeping monitoring the CSS to receive system information) or via dedicated signaling (e.g., by receiving the RRC Feedback for SI Request message, by receiving the RRC Reconfiguration message, by monitoring the USS to derive the time/frequency resources to receive the dedicated signaling) whenever the associated SI message(s), SIB(s), and/or SIB segment(s) are updated. If it is "0" or absent, the UE may indicate that it does not request the network to always provide the updated associated SI message(s), SIB(s), and/or SIB segment(s) whenever the associated SI message(s), SIB(s), and/or SIB segment(s) are updated. The indicator may be an ENUMERATED format. If it is indicated (e.g., "true"), the UE may indicate that it requests the network to always provide the updated associated SI message(s), SIB(s), and/or SIB segment(s) whenever the associated SI message(s), SIB(s), and/or SIB segment(s) are updated. The UE may receive the updated associated SI message(s), SIB(s), and/or SIB segment(s) via broadcast (e.g., by keeping monitoring the CSS to receive system information) or via dedicated signaling (e.g., by receiving the RRC Feedback for SI Request message, by receiving the RRC Reconfiguration message, by monitoring the USS to derive the time/frequency resources to receive the dedicated signaling) whenever the associated SI message(s), SIB(s), and/or SIB segment(s) are updated. If it is absent or not "true", the UE may indicate that it does not request the network to always provide the updated associated SI message(s), SIB(s), and/or SIB segment(s) whenever the associated SI message(s), SIB(s), and/or SIB segment(s) are updated.

In one implementation, when the UE receives the requested SI message(s), SIB(s), and/or SIB segment(s), the UE may start a timer associated with the requested SI message(s), SIB(s), and/or SIB segment(s). The UE may receive the starting value of timer in the same message where the UE receives the requested SI message(s), SIB(s), and/or SIB segment(s). The starting value of the timer may be preconfigured. When the timer expires, the UE may send the RRC message for the requested SI message(s), SIB(s), and/or SIB segment(s) for the updated version. Before the timer expires, the network may keep sending the updated version of the UE's requested SI message(s), SIB(s), and/or SIB segment(s) to the UE. In one implementation, the UE may (re)start the timer whenever the UE receives the requested SI message(s), SIB(s), and/or SIB segment(s) from the network.

Case 6: Information of SIB Segment(s) in SIB1

In one implementation, the network may broadcast (e.g., via SIB1) information of SIB segment(s) to the UE. The information of SIB segment(s) may include whether the SIB segment(s) is (or are) broadcast (e.g., via a Boolean indicator, via an ENUMERATED ("broadcast") format), the periodicities of the SIB segment(s), what types of SIB segment(s) carried in a SI message, what types of SIB segment(s) corresponding to a SIB, etc.

In one implementation, the network may broadcast a list of SI message information. The size of the list of SI message information may be the maximum supported number of SI message(s) per SIB1. Example information included in the SI message information may include the broadcast status of the SI message, the periodicity of the SI message, and/or a list of the SIB segment mapping information. The size of the list of the SIB segment mapping information may be the maximum supported number of SIB segment(s) per SI message. Example information included in the SIB segment mapping information may include what types of SIB segment(s), the periodicity of the SIB segment, the broadcast status of the SIB segment(s), the value tag of the SIB segment(s), the area scope of the SIB segment(s), the System Information Area ID of the SIB segment(s), and/or what types of SIB are associated with the SIB segment(s).

In one implementation, the network may broadcast a list of SI message information. The size of the list of SI message information may be the maximum supported number of SI message(s) per SIB1. Example information included in the SI message information may include the broadcast status of the SI message, the periodicity of the SI message, and/or a list of the SIB mapping information. The size of the list of SIB mapping information may be the maximum supported number of SIB per SI message. Example information included in the SIB mapping information may include what types of SIB, the periodicity of the SIB, the broadcast status of the SIB, the value tag of the SIB, the area scope of the SIB, the System Information Area ID of the SIB, what types of SIB segment(s) are associated with the SIB, and/or the number of SIB segment(s) associated with the SIB.

In one implementation, the list of SI message information including the SIB segment information may be different from the list of SI message information including the SIB information. The list of SI message information including the SIB information may or may not include the SIB segment information.

Case 7: SI Request and Feedback Procedure in Dual Connectivity (DC)

The proposed design may also be applied to the DC cases, e.g., NR-NR DC, (Next Generation) E-UTRA-NR Dual Connectivity ((NG)EN-DC), NR E-UTRA Dual Connectivity (NE-DC). The signaling (e.g., broadcast, dedicated signaling) between the PCell and the UE may not be carried by signaling radio bearer (SRB) or may be carried by SRB0, SRB1, or SRB2. The signaling (e.g., broadcast, dedicated signaling) between the PSCell and the UE may not be carried by SRB or may be carried by SRB3.

In one implementation, the UE may send the RRC message for on-demand SI request to the PCell, monitor/receive the RRC Feedback for SI Request message from the PCell, and/or monitor/receive the requested SI message(s), SIB(s), and/or SIB segment(s) from the PCell. The UE may monitor/receive the requested SI message(s), SIB(s), and/or SIB segment(s), from the PCell, via broadcast or dedicated signaling.

In one implementation, the UE may send the RRC message for on-demand SI request to the PSCell (e.g., via SRB3), monitor/receive the RRC Feedback for SI Request message from the PSCell (e.g., via SRB3), and/or monitor/receive the requested SI message(s), SIB(s), and/or SIB segment(s) from the PSCell (e.g., via SRB3). The UE may monitor/receive the requested SI message(s), SIB(s), and/or SIB segment(s), from the PSCell, via broadcast or dedicated signaling.

In one implementation, the UE may send the RRC message for on-demand SI request to the PCell, monitor/receive the RRC Feedback for SI Request message from the PSCell and/or monitor/receive the requested SI message(s), SIB(s), and/or SIB segment(s) from the PSCell. The UE may monitor/receive the requested SI message(s), SIB(s), and/or SIB segment(s), from the PSCell, via broadcast or dedicated signaling. In one implementation, the UE may send the RRC message for on-demand SI request to the PCell, and the UE may monitor/receive the requested SI message(s), SIB(s), and/or SIB segment(s) simultaneously from the PCell and from the PSCell. The UE may monitor/receive the requested SI message(s), SIB(s), and/or SIB segment(s), from the PCell, via broadcast or dedicated signaling. The UE may monitor/receive the requested SI message(s), SIB(s), and/or SIB segment(s), from the PSCell, via broadcast or dedicated signaling.

In one implementation, the UE may send the RRC message for on-demand SI request to the PSCell, monitor/receive the RRC Feedback for SI Request message from the PCell and/or monitor/receive the requested SI message(s), SIB(s), and/or SIB segment(s) from the PCell. In one implementation, the UE may send the RRC message for on-demand SI request to the PSCell, and the UE may monitor/receive the requested SI message(s), SIB(s), and/or SIB segment(s) simultaneously from the PCell and from the PSCell. The UE may monitor/receive the requested SI message(s), SIB(s), and/or SIB segment(s), from the PCell, via broadcast or dedicated signaling. The UE may monitor/receive the requested SI message(s), SIB(s), and/or SIB segment(s), from the PSCell, via broadcast or dedicated signaling.

In the disclosed implementations, the UE may receive the CSS/USS configuration of the PSCell to receive the system information on the PSCell in an RRC message (e.g., RRC Reconfiguration message, RRC Feedback for SI Request message) or in a broadcast message sent by the PCell. Upon receiving the CSS/USS configuration of the PSCell, the UE may configure itself with the CSS/USS configuration of the PSCell and monitor/receive the requested SI message(s), SIB(s), and/or SIB segment(s), from the PSCell. In one implementation, the CSS/USS configuration of the PSCell may be encapsulated in the RRC message (e.g., RRC Reconfiguration message, RRC Feedback for SI Request message) transmitted from the PCell to the UE. The PSCell may generate the CSS/USS configuration of the PSCell and transmit the CSS/USS configuration of the PSCell to the PCell. The PCell may encapsulate the CSS/USS configuration of the PSCell in the RRC message (e.g., RRC Reconfiguration message, RRC Feedback for SI Request message) and transmit the RRC message to the UE.

In the disclosed implementations, the UE may receive the CSS/USS configuration of the PCell to receive the system information on the PCell in an RRC message (e.g., RRC Reconfiguration message, RRC Feedback for SI Request message) or in a broadcast message sent by the PSCell to the UE. Upon receiving the CSS/USS configuration of the PCell, the UE may configure itself with the CSS/USS configuration of the PCell and monitor/receive the requested SI message(s), SIB(s), and/or SIB segment(s), from the PCell. In one implementation, the CSS/USS configuration of the PCell may be encapsulated in the RRC message (e.g., RRC Reconfiguration message, RRC Feedback for SI Request message) transmitted from the PSCell to the UE. The PCell may generate the CSS/USS configuration of the PCell and transmit the CSS/USS configuration of the PCell to the PSCell. The PSCell may encapsulate the CSS/USS configuration of the PCell in the RRC message (e.g., RRC Reconfiguration message, RRC Feedback for SI Request message) and transmit the RRC message to the UE.

In the disclosed implementations, the UE may receive an indicator in an RRC message (e.g., RRC Reconfiguration message, RRC Feedback for SI Request message) or in a broadcast message sent by the PCell to the UE. The indicator may indicate to the UE to monitor/receive the requested SI message(s), SIB(s), and/or SIB segment(s) on the PSCell. Upon receiving the indicator, the UE may monitor/receive the requested SI message(s), SIB(s), and/or SIB segment(s) on the PSCell. In one implementation, the indicator may be applied for all the UE's requested SI message(s), SIB(s), and/or SIB segment(s) in the RRC message (e.g., RRC message for on-demand SI request). The UE may stop monitoring the requested SI message(s), SIB(s), and/or SIB segment(s) from the PCell, and may monitor the requested SI message(s), SIB(s), and/or SIB segment(s) from the PSCell. In one implementation, the indicator may be associated with specific SI message(s), SIB(s), and/or SIB segment(s) among all the UE's requested SI message(s), SIB(s), and/or SIB segment(s) in the RRC message (e.g., RRC message for on-demand SI request). The UE may monitor the requested SI message(s), SIB(s), and/or SIB segment(s) simultaneously from the PCell and the PSCell.

In the disclosed implementations, the UE may receive an indicator in an RRC message (e.g., RRC Reconfiguration message, RRC Feedback for SI Request message) or in a broadcast message sent by the PSCell. The indicator may indicate to the UE to monitor/receive the requested SI message(s), SIB(s), and/or SIB segment(s) on the PCell. Upon receiving the indicator, the UE may monitor/receive the requested SI message(s), SIB(s), and/or SIB segment(s) on the PCell. In one implementation, the indicator may be applied for all the UE's requested SI message(s), SIB(s), and/or SIB segment(s) in the RRC message (e.g., RRC message for on-demand SI request). The UE may stop monitoring the requested SI message(s), SIB(s), and/or SIB segment(s) from the PSCell, and may monitor the requested SI message(s), SIB(s), and/or SIB segment(s) from the PCell. In one implementation, the indicator may be associated with specific SI message(s), SIB(s), and/or SIB segment(s) among all the UE's requested SI message(s), SIB(s), and/or SIB segment(s) in the RRC message (e.g., RRC message for on-demand SI request). The UE may monitor the requested SI message(s), SIB(s), and/or SIB segment(s) simultaneously from the PCell and the PSCell.

Network (NW), cell, camped cell, serving cell, base station, gNB, ng-eNB, BS, cell/gNB, and eNB may be used interchangeably in the present disclosure. In some implementations, some of these items may refer to the same network entity.

The RAT may include, but is not limited to, NR, LTE, E-UTRA connected to 5GC, LTE connected to 5GC, E-UTRA connected to EPC, and LTE connected to EPC.

The disclosed mechanism may be used for licensed frequency and/or unlicensed frequency.

System information (SI) may include MIB, SIB1, and other SI. Minimum SI may include MIB and SIB1. Other SI may refer to SIB2, SIB5, SIB4, SIB5, and other SIB(s).

Dedicated signaling may refer to (but is not limited to referring to) RRC message(s), such as RRC (Connection) Setup Request message, RRC (Connection) Setup message, RRC (Connection) Setup Complete message, RRC (Connection) Reconfiguration message, RRC Reconfiguration message with information including reconfiguration with sync configuration, RRC Reconfiguration message without the information of reconfiguration with sync configuration, the information of reconfiguration with sync configuration included in RRC Reconfiguration message, RRC (Connection) Reconfiguration Complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. The UE may monitor the USS to derive the time/frequency resources for the reception of the dedicated signaling.

The RRC_IDLE/RRC_INACTIVE UE may camp on a cell. The RRC_CONNECTED UE may be served by a (serving) cell. Implementations in the present disclosure may be applicable for RRC_IDLE/RRC_INACTIVE/RRC_CONNECTED UE(s).

The UE may be served by a cell, e.g., serving cell. The serving cell may serve (but is not limited to serving) an RRC_CONNECTED UE. The serving cell may be (but is not limited to) a suitable cell.

The UE may camp on a cell, e.g., camped cell. The camped cell may be a suitable cell or an acceptable cell.

A suitable cell is a cell on which a UE may camp. The UE (e.g., especially not in an SNPN access mode) may consider a cell as suitable if the following conditions are fulfilled: (1) the cell is part of either the selected PLMN or the registered PLMN or PLMN of the Equivalent PLMN list, and (2) the cell selection criteria (e.g., S criteria) of the cell are fulfilled. Furthermore, according to the latest information provided by the NAS of the UE, the suitable cell is not barred. The suitable cell is part of at least one Tracking Area (TA) that is not part of the list of "Forbidden Tracking Areas", which belongs to a PLMN that fulfills the condition (1).

An acceptable cell is a cell on which the UE may camp to obtain limited service (originate emergency calls and receive ETWS and CMAS notifications). Such a cell may fulfill the following requirements, which is the minimum set of requirements to initiate an emergency call and to receive ETWS and CMAS notification in an NR network: (1) the cell is not barred, and/or (2) the cell selection criteria are fulfilled.

A DL BWP may refer to an initial (DL) BWP, a default BWP, an active (DL) BWP.

Primary Cell (PCell): The MCG cell, operating on the primary frequency, in which the UE either performs the initial connection establishment procedure or initiates the connection re-establishment procedure.

Primary SCG Cell (PSCell): For dual connectivity operation, the SCG cell in which the UE performs random access when performing the Reconfiguration with Sync procedure.

Serving Cell: For a UE in the RRC_CONNECTED state not configured with CA/DC, there is only one serving cell including the primary cell. For a UE in the RRC_CONNECTED state configured with CA/DC, the term "serving cells" is used to denote the set of cells including the Special Cell(s) and all secondary cells.

Secondary Cell (SCell): For a UE configured with CA, a cell providing additional radio resources on top of Special Cell.

Special Cell (SpCell): For Dual Connectivity operation, the term Special Cell refers to the PCell of the MCG or the PSCell of the SCG; otherwise, the term Special Cell refers to the PCell.

Master Cell Group (MCG): in MR-DC, a group of serving cells associated with the Master Node, including the SpCell (e.g., PCell) and optionally one or more SCells.

Master node: in MR-DC, the radio access node that provides the control plane connection to the core network. It may be a Master eNB (in EN-DC), a Master ng-eNB (in NGEN-DC), or a Master gNB (in NR-DC and NE-DC).

Secondary Cell Group (SCG): in MR-DC, a group of serving cells associated with the Secondary Node, including the SpCell (e.g., PSCell) and optionally one or more SCells.

Secondary node: in MR-DC, the radio access node, with no control plane connection to the core network, providing additional resources to the UE. It may be an en-gNB (in EN-DC), a Secondary ng-eNB (in NE-DC), or a Secondary gNB (in NR-DC and NGEN-DC).

The CSS may be a Type0-PDCCH CSS and/or a Type0A-PDCCH CSS.

The UE's required SI may be interpreted as the UE's required on-demand SI.

The on-demand SI may refer to the system information (e.g., other SI) that the UE requests from the network. On-demand SI may include SI message(s), SIB(s), and/or SIB segment(s).

When the UE reads the SIB1 to check whether the requested on-demand SI is broadcast, the UE may check the status of the requested SI message, SIB, and/or SIB segment in the SIB1. In one implementation, the UE may read the SIB1 to check whether the requested SI is provided by the serving cell.

In some implementations, the UE may send the RRC message for on-demand SI request to the network in a first modification period. The UE may receive the RRC Feedback for SI Request message in a second modification period. The UE may receive the requested SI message(s), SIB(s), and/or SIB segment(s) in a third modification period. The first modification period, the second modification period and the third modification period may be the same or different. In one implementation, for RRC_IDLE/INACTIVE UE, the first modification period, the second modification period, and the third modification may be the same. In one implementation, for RRC_CONNECTED UE, the first modification period, the second modification period, and the third modification may be the same or different.

In one implementation, the network may provide system information via dedicated signaling to an RRC_CONNECTED UE using the RRC Reconfiguration message. For example, an RRC_CONNECTED UE may be configured with one or more active BWP(s) with CSS configured to monitor system information or paging. For example, an RRC_CONNECTED UE may be configured with one or more active BWP(s) with USS configured to monitor the dedicated signaling.

Figure 2:
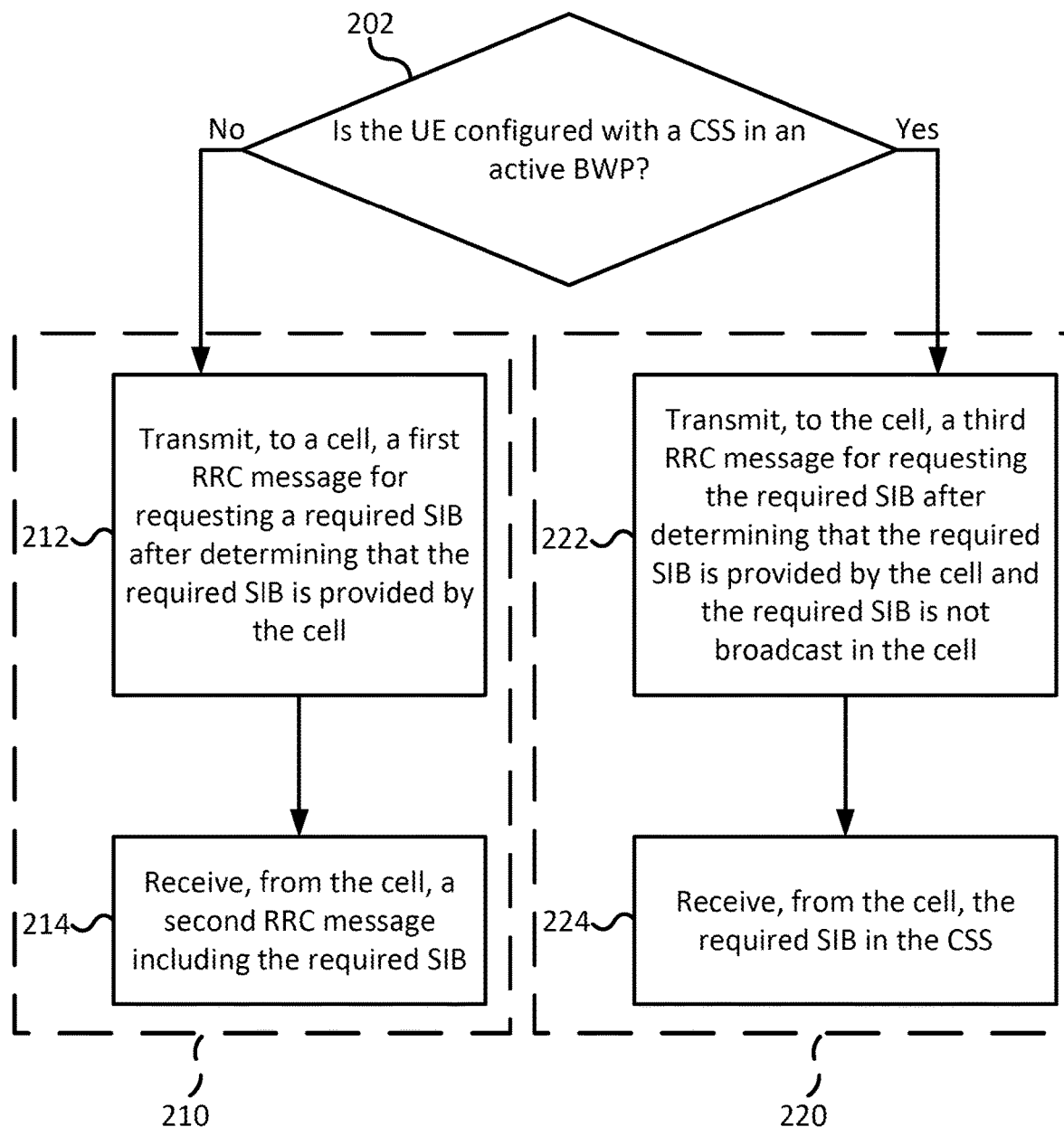
FIG. 2 is a flowchart of a method performed by an RRC_CONNECTED UE for acquiring system information according to an example implementation of the present disclosure.

FIG. 2 is a flowchart illustrating a method 200 performed by an RRC_CONNECTED UE for acquiring system information according to an example implementation of the present disclosure. In action 202, the UE may determine whether the UE is configured with a CSS in an active BWP. The UE may perform a first set of operations 210 after determining that the UE is not configured with the CSS in the active BWP. The UE may perform a second set of operations 220 after determining that the UE is configured with the CSS in the active BWP.

The first set of operations 210 may include action 212 and action 214. In action 212, the UE may transmit, to a cell, a first RRC message for requesting a required SIB after determining that the required SIB is provided by the cell. The first RRC message may indicate at least one of a list of requested SIBs with ENUMERATED format and a list of requested posSIBs with ENUMERATED format. An RLC AM entity of the UE may send an RLC AM PDU that includes the first RRC message to a MAC entity of the UE in a UL-DCCH over SRB1. In action 214, the UE may receive, from the cell, a second RRC message including the required SIB. The UE may receive the required SIB via dedicated signaling when there is no CSS configured in the active BWP. Then the UE may apply the SIB acquired in action 214.

The second set of operations 220 may include action 222 and action 224. In action 222, the UE may transmit, to the cell, a third RRC message for requesting the required SIB after determining that the required SIB is provided by the cell and the required SIB is not broadcast in the cell. The third RRC message may indicate at least one of a list of requested SIBs with ENUMERATED format and a list of requested posSIBs with ENUMERATED format. An RLC AM entity of the UE may send an RLC AM PDU that includes the third RRC message to a MAC entity of the UE in a UL-DCCH over SRB1. In action 224, the UE may receive, from the cell, the required SIB in the CSS. Then the UE may apply the SIB acquired in action 224.

Figure 3:
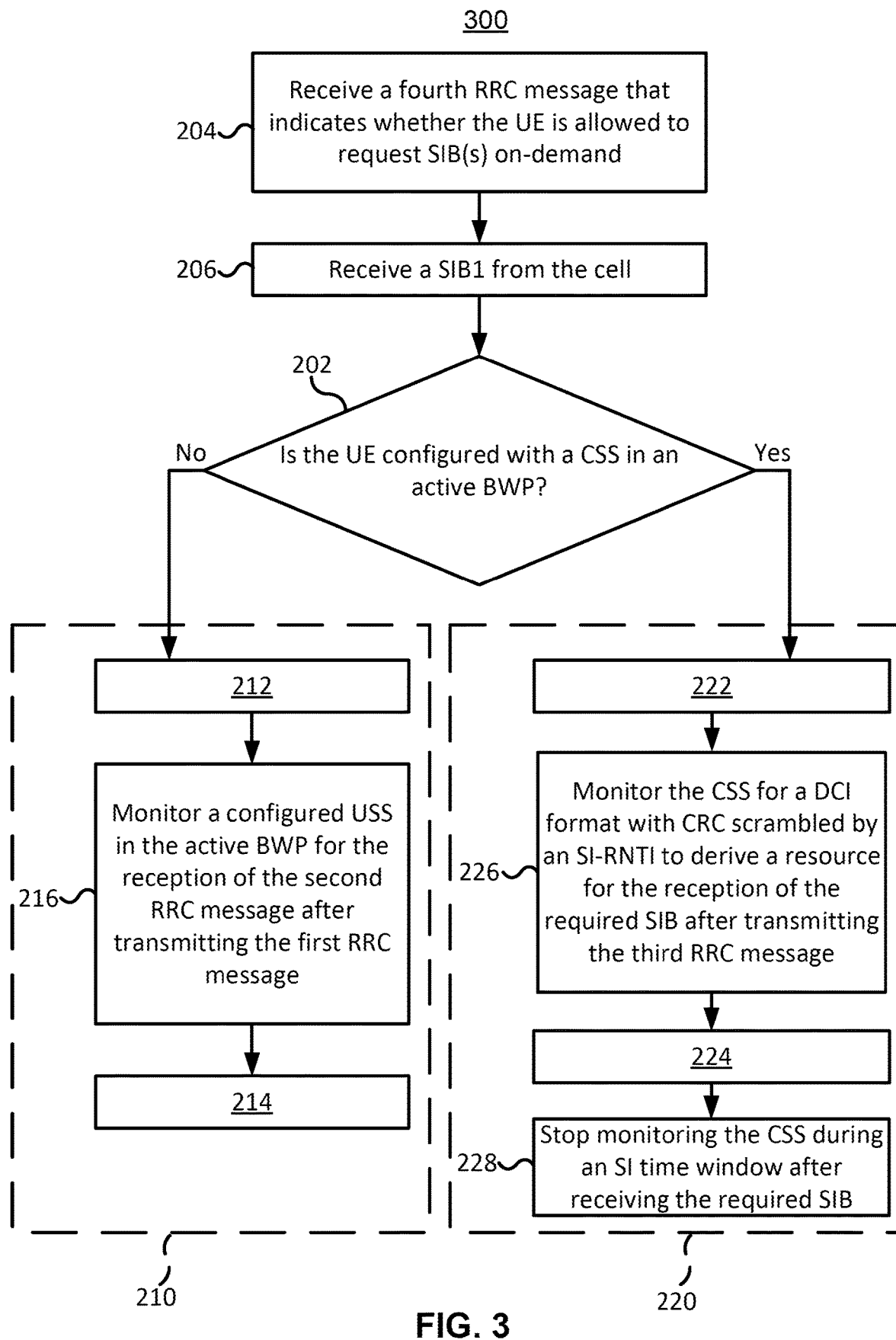
FIG. 3 is a flowchart of a method performed by an RRC_CONNECTED UE for acquiring system information according to another example implementation of the present disclosure.

FIG. 3 is a flowchart illustrating a method 300 performed by an RRC_CONNECTED UE for acquiring system information according to another example implementation of the present disclosure. Blocks with the same reference numerals as in FIG. 2 can be referred to as the description about FIG. 2. For example, description about actions 202, 212, 214, 222, and 224 in FIG. 3 may be referred to actions 202, 212, 214, 222 and 224, respectively, in FIG. 2.

In action 204, the UE may receive a fourth RRC message that indicates whether the UE is allowed to request SIB(s) on-demand. Action 204 may be performed before action 202 in which the UE determines whether the UE is configured with the CSS in the active BWP. In one implementation, the fourth RRC message may include an IE/parameter/indicator that indicates whether the UE is allowed to request SIB on-demand. The UE may perform subsequent actions (e.g., including action 206, action 202, the first set of operations 210, and the second set of operations 220) after determining that the fourth RRC message indicates that the UE is allowed to request SIB on-demand.

In one implementation, the fourth RRC message received in action 204 may indicate an initial value of a prohibit timer, which may control when the UE is allowed to transmit an RRC message for on-demand SI request. In one implementation, the UE may set the prohibit timer to the initial value upon receiving the fourth RRC message. In another implementation, the UE may set the prohibit timer to the initial value upon transmitting the first RRC message in action 212 and before the UE starts the prohibit timer. In another implementation, the UE may set the prohibit timer to the initial value upon transmitting the third RRC message in action 222 and before the UE starts the prohibit timer. When the UE is configured with the CSS in the active BWP, the UE may (re)start the prohibit timer (e.g., (re)starting from the initial value) after transmitting the first RRC message in action 212, and the UE may stop the prohibit timer (e.g., resetting the prohibit timer to the initial value) after receiving the required SIB in action 214. When the UE is not configured with the CSS in the active BWP, the UE may (re)start the prohibit timer (starting from the initial value) after transmitting the third RRC message in action 222, and the UE may stop the prohibit timer (e.g., resetting the prohibit timer to the initial value) after receiving the required SIB in action 224. In one implementation, the UE is not allowed to transmit another RRC message for requesting another SIB when the prohibit timer is running. For example, the UE does not transmit another RRC message for requesting another SIB until the prohibit timer expires (e.g., when the value of the prohibit timer reaches zero).

In action 206, the UE may receive a SIB1 from the cell. In one implementation, the UE may read the SIB1 after/before determining that the UE is configured to perform an on-demand SI request procedure by the cell (e.g., a determination made in action 204). In one implementation, the UE may read and/or apply the content of the SIB1 before action 202, the first set of operations 210, and the second set of operations 220. In one implementation, the SIB1 may indicate whether the required SIB is provided by the cell. The UE may determine whether the required SIB is provided by the cell in action 212 or action 222 based on the SIB1 received in action 206.

In one implementation, the SIB1 may further indicate whether the required SIB is broadcast in the cell. The UE may determine whether the required SIB is broadcast in the cell in action 222 based on the SIB1 received in action 206.

In one implementation, the UE may be configured with a USS when the UE is not configured with the CSS in the active BWP. In one implementation, the first set of operations 210 may further include action 216. In action 216, the UE may monitor a configured USS in the active BWP for the reception of the second RRC message after transmitting the first RRC message. The second RRC message that includes the required SIB may be transmitted on the configured USS.

In one implementation, the second set of operations 220 may further include action 226 and/or action 228. In action 226, the UE may monitor the CSS for a DCI format with CRC scrambled by an SI-RNTI to derive a resource for the reception of the required SIB after transmitting the third RRC message. The UE may apply the content of the required SIB after receiving the required SIB. In action 228, the UE may stop monitoring the CSS during an SI time window after receiving the required SIB.

Actions shown in FIG. 3 should not be construed as necessarily order dependent. The order in which the process is disclosed is not intended to be construed as a limitation. Moreover, some of the actions in FIG. 3 may be omitted in some implementations. In one implementation, action 206 may be performed before action 204. In one implementation, action 228 may be optionally omitted.

Figure 4:
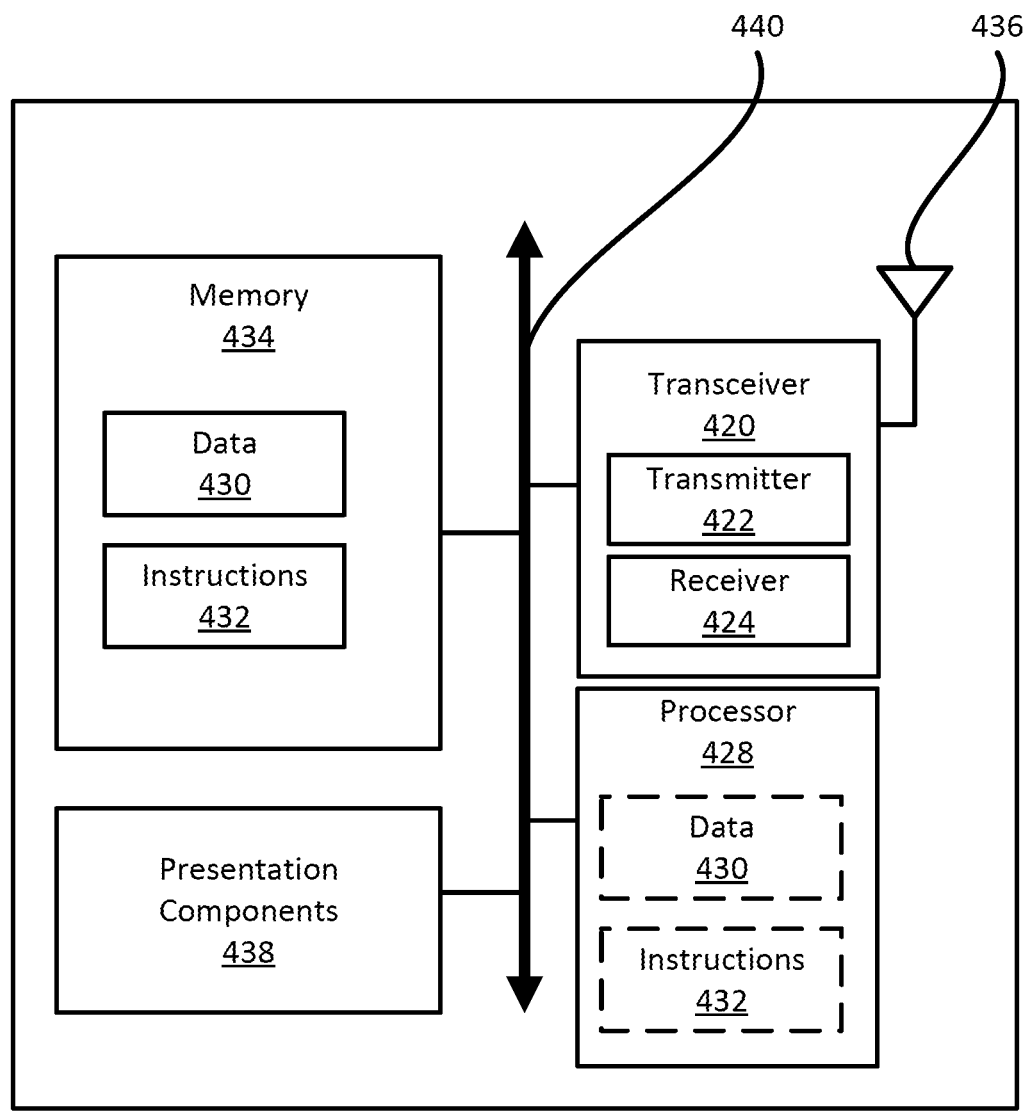
FIG. 4 is a block diagram illustrating a node for wireless communication in accordance with various aspects of the present disclosure.

FIG. 4 is a block diagram illustrating a node 400 for wireless communication in accordance with various aspects of the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable, and flexibly usable subframes and slot formats. The transceiver 420 may be configured to receive data and control channels.

The node 400 may include a variety of computer-readable media. Computer-readable media may be any available media that may be accessed by the node 400 and include both volatile (and non-volatile) media, and removable (and non-removable) media.

The computer-readable media may include computer storage media and communication media. Computer storage media may include both volatile (and/or non-volatile media), and removable (and/or non-removable) media implemented in any method or technology for storage of information, such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media may not include a propagated data signal. Communication media may typically embody computer-readable instructions, data structures, program modules, or other data in a modulated data signal, such as a carrier wave or other transport mechanisms, and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store computer-readable and/or computer-executable instructions 432 (e.g., software codes) that are configured to, when executed, cause the processor 428 to perform various functions disclosed herein, for example, with reference to FIGS. 1 through 3. Alternatively, the instructions 432 may not be directly executable by the processor 428 but be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the instructions 432 received from the memory 434, and information transmitted and received via the transceiver 420, the baseband communications module, and/or the network communications module. The processor 428 may also process information to send to the transceiver 420 for transmission via the antenna 436 to the network communications module for transmission to a CN.

One or more presentation components 438 may present data indications to a person or another device. Examples of presentation components 438 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method for acquiring system information (SI) performed by a user equipment (UE), the method comprising:
   performing a first set of operations after determining that the UE is in a radio resource control (RRC)_CONNECTED state with an active bandwidth part (BWP) not configured with a common search space (CSS) with a field searchSpaceOtherSystemInformation, the first set of operations comprising:
  transmitting, to a cell, a first RRC message to request a required system information block (SIB) and starting a timer, after determining that (i) the required SIB is supported by the cell, (ii) the UE is allowed to request a SIB on-demand, and (iii) the timer is not running, and
  receiving, from the cell, an RRCReconfiguration message including the required SIB; and
performing a second set of operations after determining that the UE is in the RRC_CONNECTED state with the active BWP configured with the CSS with the field searchSpaceOtherSystemInformation, the second set of operations comprising:
  transmitting, to the cell, the first RRC message to request the required SIB and starting the timer, after determining that (i) the required SIB is not being broadcast in the cell, (ii) the UE is allowed to request the SIB on-demand, and (iii) the timer is not running; and
  monitoring the CSS to acquire the required SIB.

2. The method of claim 1, further comprising:
receiving, from the cell, a system information block type 1 (SIB1),
wherein the SIB1 indicates whether the required SIB is supported by the cell.

3. The method of claim 2, wherein the SIB1 further indicates whether the required SIB is being broadcast in the cell.

4. The method of claim 1, wherein the first set of operations further comprises:
monitoring a configured UE-specific search space in the active BWP for the reception of the RRCReconfiguration message after transmitting the first RRC message.

5. The method of claim 1, wherein monitoring the CSS comprises:
monitoring the CSS for a downlink control information (DCI) format with cyclic redundancy check (CRC) scrambled by a system information radio network temporary identifier (SI-RNTI) to derive a resource for reception of the required SIB after transmitting the first RRC message.

6. The method of claim 1, wherein the second set of operations further comprises:
stopping monitoring the CSS during an SI time window after acquiring the required SIB.

7. The method of claim 1, further comprising:
receiving a second RRC message including an indicator that indicates whether the UE is allowed to request the SIB on-demand.

8. The method of claim 1, further comprising:
stopping the timer after receiving the required SIB; and
receiving a second RRC message that indicates an initial value of the timer before transmitting the first RRC message,
wherein the UE is not allowed to transmit the first RRC message to request another SIB when the timer is running.

9. The method of claim 1, wherein the first RRC message indicates at least one of a list of requested SIBs with ENUMERATED format or a list of requested positioning SIBs (posSIBs) with the ENUMERATED format.

10. The method of claim 1, further comprising:
sending, by a radio link control (RLC) acknowledged mode (AM) entity of the UE, an RLC AM protocol data unit (PDU) that includes the first RRC message to a medium access control (MAC) entity of the UE in an uplink dedicated control channel (UL-DCCH) over signaling radio bearer 1 (SRB1).

11. A user equipment (UE) comprising:
one or more processors; and
at least one memory coupled to at least one of the one or more processors, wherein the at least one memory stores one or more computer-executable instructions that, when executed by the at least one of the one or more processors, cause the UE to:
perform a first set of operations after determining that the UE is in a radio resource control (RRC)_CONNECTED state with an active bandwidth part (BWP) not configured with a common search space (CSS) with a field searchSpaceOtherSystemInformation, the first set of operations comprising:
  transmitting, to a cell, a first RRC message to request a required system information block (SIB) and starting a timer, after determining that (i) the required SIB is supported by the cell, (ii) the UE is allowed to request a SIB on-demand, and (iii) the timer is not running, and
  receiving, from the cell, an RRCReconfiguration message including the required SIB; and
perform a second set of operations after determining that the UE is in the RRC_CONNECTED state with the active BWP configured with the CSS with the field searchSpaceOtherSystemInformation, the second set of operations comprising:
  transmitting, to the cell, the first RRC message to request the required SIB and starting the timer, after determining that (i) the required SIB is not being broadcast in the cell, (ii) the UE is allowed to request the SIB on-demand, and (iii) the timer is not running; and
  monitoring the CSS to acquire the required SIB.

12. The UE of claim 11, wherein the one or more computer-executable instructions, when executed by the at least one of the one or more processors, further cause the UE to:
receive, from the cell, a system information block type 1 (SIB1),
wherein the SIB1 indicates whether the required SIB is supported by the cell.

13. The UE of claim 12, wherein the SIB1 further indicates whether the required SIB is being broadcast in the cell.

14. The UE of claim 11, wherein the first set of operations further comprises:
monitoring a configured UE-specific search space in the active BWP for the reception of the RRCReconfiguration message after transmitting the first RRC message.

15. The UE of claim 11, wherein monitoring the CSS comprises:
monitoring the CSS for a downlink control information (DCI) format with cyclic redundancy check (CRC) scrambled by a system information radio network temporary identifier (SI-RNTI) to derive a resource for the reception of the required SIB after transmitting the first RRC message.

16. The UE of claim 11, wherein the second set of operations further comprises:
stopping monitoring the CSS during a system information (SI) time window after acquiring the required SIB.

17. The UE of claim 11, wherein the computer-executable program, when executed by the at least one of the one or more processors, further causes the UE to:

receive a second RRC message including an indicator that indicates whether the UE is allowed to request the SIB on-demand.

18. The UE of claim 11, wherein the one or more computer-executable instructions, when executed by the at least one of the one or more processors, further cause the UE to:
    stop the timer after receiving the required SIB; and
    receive a second RRC message that indicates an initial value of the timer before transmitting the first RRC message,
    wherein the UE is not allowed to transmit the first RRC message to request another SIB when the timer is running.

19. The UE of claim 11, wherein the first RRC message indicates at least one of a list of requested SIBs with ENUMERATED format or a list of requested positioning SIBs (posSIBs) with the ENUMERATED format.

20. The UE of claim 11, wherein the one or more computer-executable instructions, when executed by the at least one of the one or more processors, further cause the UE to:
    send, by a radio link control (RLC) acknowledged mode (AM) entity of the UE, an RLC AM protocol data unit (PDU) that includes the first RRC message to a medium access control (MAC) entity of the UE in an uplink dedicated control channel (UL-DCCH) over signaling radio bearer 1 (SRB1).

\* \* \* \* \*